(12) United States Patent
Ohki et al.

(10) Patent No.: US 10,943,562 B2
(45) Date of Patent: Mar. 9, 2021

(54) DISPLAY CONTROL APPARATUS AND DISPLAY CONTROL METHOD

(71) Applicant: SONY CORPORATION, Tokyo (JP)

(72) Inventors: Yoshihito Ohki, Tokyo (JP); Kenichi Yamaura, Kanagawa (JP); Hajime Ogura, Kanagawa (JP); Reiko Mitsugi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/320,227

(22) PCT Filed: Jun. 15, 2017

(86) PCT No.: PCT/JP2017/022032
§ 371 (c)(1),
(2) Date: Jan. 24, 2019

(87) PCT Pub. No.: WO2018/034046
PCT Pub. Date: Feb. 22, 2018

(65) Prior Publication Data
US 2019/0272805 A1    Sep. 5, 2019

(30) Foreign Application Priority Data

Aug. 17, 2016    (JP) .............................. JP2016-159813

(51) Int. Cl.
| | |
|---|---|
| *G09G 5/10* | (2006.01) |
| *G09G 5/36* | (2006.01) |
| *G09G 5/00* | (2006.01) |
| *H04N 9/31* | (2006.01) |

(52) U.S. Cl.
CPC .............. *G09G 5/10* (2013.01); *G09G 5/00* (2013.01); *G09G 5/36* (2013.01); *H04N 9/31* (2013.01)

(58) Field of Classification Search
CPC ............... H04N 9/31; G09G 5/00; G09G 5/10
See application file for complete search history.

(56) References Cited

U.S. PATENT DOCUMENTS

| | | | |
|---|---|---|---|
| 2007/0040033 A1* | 2/2007 | Rosenberg ............... | A47G 1/02 235/462.36 |
| 2008/0239243 A1 | 10/2008 | Hasegawa et al. | |
| 2011/0096136 A1* | 4/2011 | Liu ........................ | H04N 7/144 348/14.07 |
| 2012/0144421 A1* | 6/2012 | Kuroda .................. | G06Q 30/02 725/36 |

(Continued)

FOREIGN PATENT DOCUMENTS

| | | |
|---|---|---|
| AU | 2013203007 A1 | 10/2013 |
| CN | 101276136 A | 10/2008 |

(Continued)

OTHER PUBLICATIONS

International Search Report and Written Opinion of PCT Application No. PCT/JP2017/022032, dated Sep. 19, 2017, 11 pages of ISRWO.

*Primary Examiner* — Grace Q Li
(74) *Attorney, Agent, or Firm* — Chip Law Group

(57) ABSTRACT

Provided is a display control apparatus including a display control unit that controls a display of each of a first display region and a second display region according to whether or not a person exists in an inner region of a space between the first display region and the second display region.

19 Claims, 17 Drawing Sheets

(56) References Cited

U.S. PATENT DOCUMENTS

| | | | |
|---|---|---|---|
| 2013/0265232 A1 | 10/2013 | Yun et al. | |
| 2014/0204023 A1* | 7/2014 | Kumar | G06K 9/00671 |
| | | | 345/156 |
| 2014/0347267 A1* | 11/2014 | Nishi | G06F 3/147 |
| | | | 345/156 |
| 2015/0348293 A1* | 12/2015 | Sugahara | A61B 6/032 |
| | | | 345/424 |
| 2016/0295086 A1* | 10/2016 | Bhat | H04N 5/2256 |

FOREIGN PATENT DOCUMENTS

| | | |
|---|---|---|
| CN | 104246688 A | 12/2014 |
| CN | 104272371 A | 1/2015 |
| EP | 1975697 A1 | 10/2008 |
| EP | 2657929 A2 | 10/2013 |
| JP | 2008-268859 A | 11/2008 |
| JP | 2009-246638 A | 10/2009 |
| JP | 2011-242699 A | 12/2011 |
| JP | 2013-205526 A | 10/2013 |
| JP | 2015-127755 A | 7/2015 |
| JP | 2015-518580 A | 7/2015 |
| KR | 10-2008-0087676 A | 10/2008 |
| KR | 10-2013-0113902 A | 10/2013 |
| RU | 2014140597 A | 4/2016 |
| TW | 200842484 A | 11/2008 |
| WO | 2013/099407 A1 | 7/2013 |
| WO | 2013/145706 A1 | 10/2013 |

* cited by examiner

FIG. 4

|  | PERSON IN INNER REGION (FACING FRONT) | PERSON IN INNER REGION (FACING REAR) | NO PERSON IN INNER REGION |
|---|---|---|---|
| PERSON IN OUTER REGION | BACKGROUND: OUTWARD CONTENT (STRONG) FOREGROUND: INWARD CONTENT (WEAK) | BACKGROUND: INWARD CONTENT (WEAK) FOREGROUND: OUTWARD CONTENT (STRONG) | BACKGROUND: OUTWARD CONTENT FOREGROUND: OUTWARD CONTENT |
| NO PERSON IN OUTER REGION |  | BACKGROUND: INWARD CONTENT FOREGROUND: INWARD CONTENT |  |

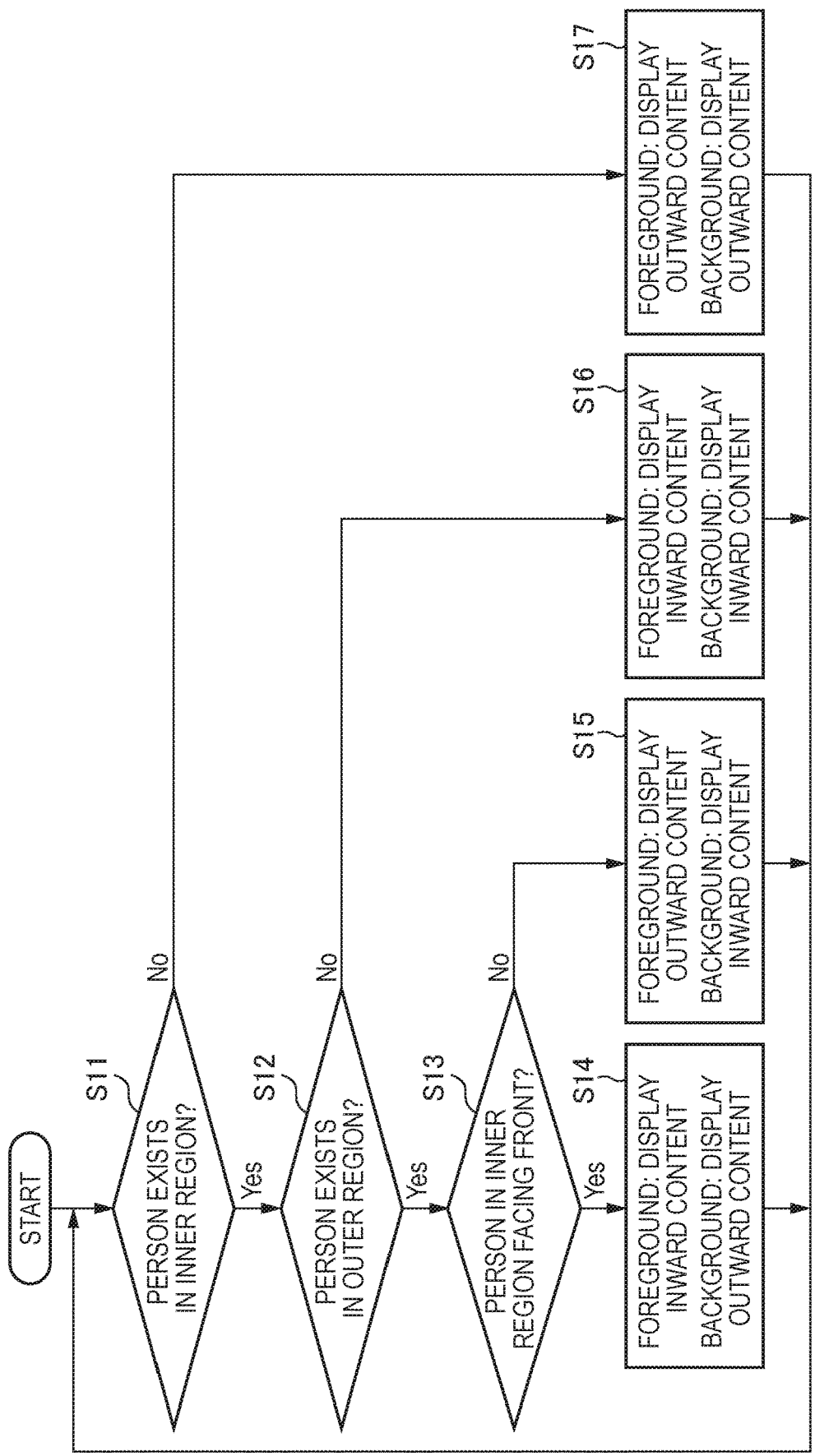

DISPLAY CONTROL APPARATUS AND DISPLAY CONTROL METHOD

CROSS REFERENCE TO RELATED APPLICATIONS

This application is a U.S. National Phase of International Patent Application No. PCT/JP2017/022032 filed on Jun. 15, 2017, which claims priority benefit of Japanese Patent Application No. JP 2016-159813 filed in the Japan Patent Office on Aug. 17, 2016. Each of the above-referenced applications is hereby incorporated herein by reference in its entirety.

TECHNICAL FIELD

The present disclosure relates to a display control apparatus, a display control method, and a program.

BACKGROUND ART

Recently, there exists technology that causes content to be displayed in a display region. For example, there exists a technology that causes content to be displayed in a display region by projecting an image as an example of content from a light source onto a screen (for example, see Patent Literature 1). According to such technology, the content displayed in the display region is viewed by a person.

CITATION LIST

Patent Literature

Patent Literature 1: JP 2015-127755A

DISCLOSURE OF INVENTION

Technical Problem

However, it is desirable to provide a technology that presents content such that a person is drawn to the content more strongly.

Solution to Problem

According to the present disclosure, there is provided a display control apparatus including: a display control unit that controls a display of each of a first display region and a second display region according to whether or not a person exists in an inner region of a space between the first display region and the second display region.

According to the present disclosure, there is provided a display control method including: controlling, by a processor, a display of each of a first display region and a second display region according to whether or not a person exists in an inner region of a space between the first display region and the second display region.

According to the present disclosure, there is provided a program causing a computer to function as a display control apparatus including: a display control unit that controls a display of each of a first display region and a second display region according to whether or not a person exists in an inner region of a space between the first display region and the second display region.

Advantageous Effects of Invention

According to the present disclosure as described above, there is provided a technology capable of presenting content such that a person is drawn to the content more strongly. Note that the effects described above are not necessarily limitative. With or in the place of the above effects, there may be achieved any one of the effects described in this specification or other effects that may be noticed from this specification.

BRIEF DESCRIPTION OF DRAWINGS

FIG. 4 is a table summarizing each example of content differentiation.

FIG. 5 is a flowchart illustrating exemplary operations of content differentiation.

MODE(S) FOR CARRYING OUT THE INVENTION

Figure 1:
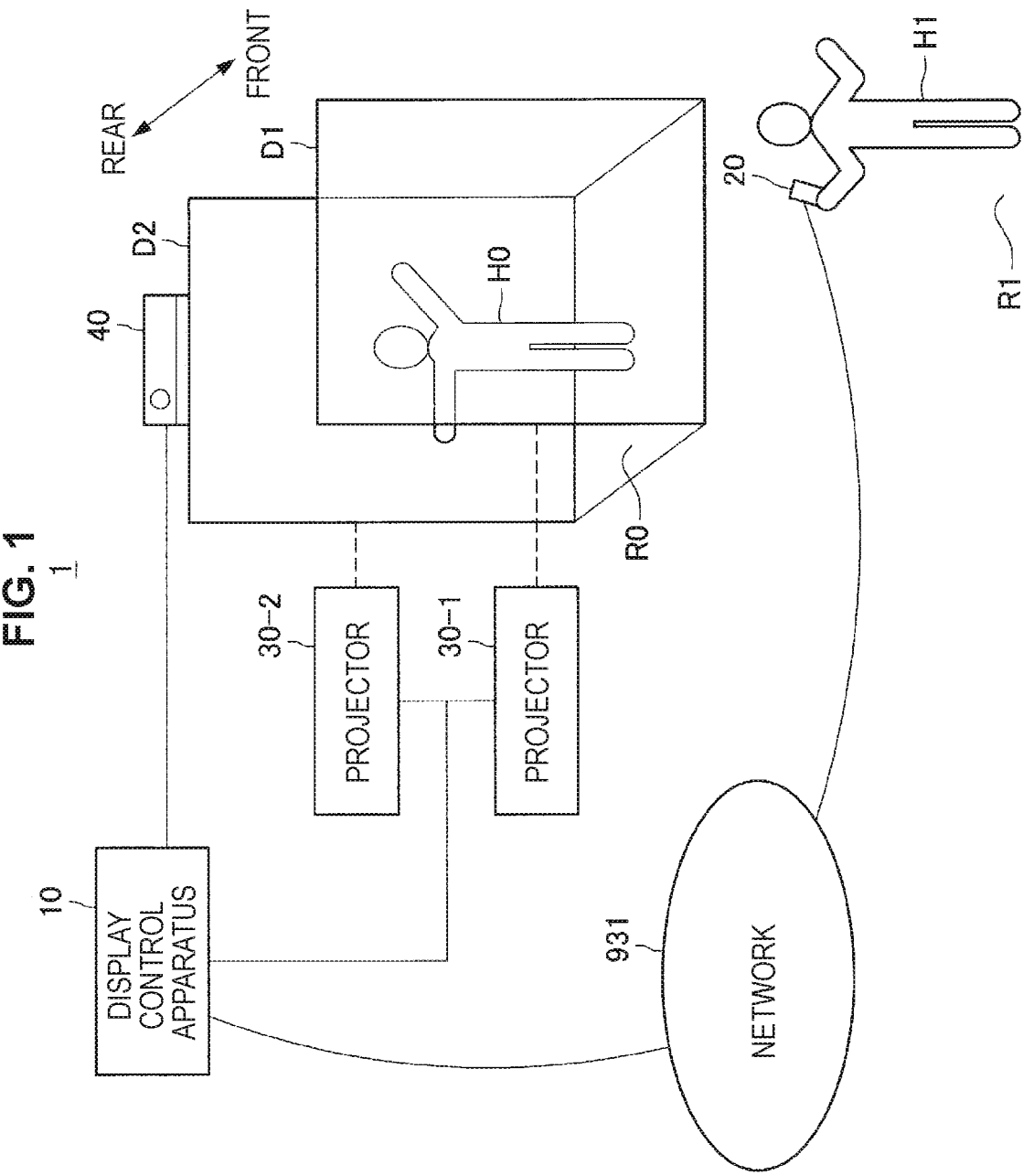
FIG. 1 is a diagram illustrating an exemplary configuration of a display control system according to one embodiment of the present disclosure.

Hereinafter, (a) preferred embodiment (s) of the present disclosure will be described in detail with reference to the appended drawings. In this specification and the appended drawings, structural elements that have substantially the same function and structure are denoted with the same reference numerals, and repeated explanation of these structural elements is omitted.

Note that, in the present specification and the drawings, structural elements that have substantially the same function and structure are sometimes distinguished from each other using different numbers after the same reference sign. However, when there is no need in particular to distinguish structural elements that have substantially the same function and structure, the same reference sign alone is attached.

Hereinafter, the description will proceed in the following order.

0. Background
1. Embodiment of present disclosure
  1.1. Exemplary system configuration
  1.2. Exemplary functional configuration
  1.3. Detailed functions of display control system
    1.3.1. Content differentiation
    1.3.2. Case in which multiple persons exist
    1.3.3. Complementing and utilizing screened region
    1.3.4. Control of parameters
    1.3.5. Capturing image of person existing in inner region
  1.4. Exemplary operation of information processing system
  1.5. Exemplary hardware configuration
2. Conclusion

0. BACKGROUND

Recently, there exists technology that causes content to be displayed in a display region. For example, there exists a technology that causes content to be displayed in a display region by projecting an image as an example of content from a light source onto a screen (for example, see JP 2015-127755A). According to such technology, the content displayed in the display region is viewed by a person. However, it is desirable to provide a technology that presents content such that a person is drawn to the content more strongly.

1. EMBODIMENT OF PRESENT DISCLOSURE

[1.1. Exemplary System Configuration]

First, an exemplary configuration of a display control system according to one embodiment of the present disclosure will be described with reference to the drawings. FIG. 1 is a diagram illustrating an exemplary configuration of the display control system according to one embodiment of the present disclosure. As illustrated in FIG. 1, the display control system 1 is provided with a display control apparatus 10, a terminal 20, a projector 30-1, a projector 30-2, and a sensor 40. This specification primarily anticipates the case in which a network 931 is a wireless local area network (LAN), but as also described later, the type of the network 931 is not limited. Herein, the display control apparatus 10 and the terminal 20 are able to communicate over the network 931.

The display control apparatus 10 is anticipated to be a computer (such as a server, for example). The terminal 20 is held by a person H1. The example illustrated in FIG. 1 anticipates the case in which the terminal 20 is a smartphone, but the type of the terminal 20 is not particularly limited. For example, the terminal 20 may also be a game console, a mobile phone, a tablet, a personal computer (PC), or another terminal.

The projector 30-1 displays a first display region D1 in accordance with control by the display control apparatus 10, and the projector 30-2 displays a second display region D2 in accordance with control by the display control apparatus 10. Referring to FIG. 1, an inner region R0 of the space between the first display region D1 and the second display region D2 is illustrated. Furthermore, an outer region R1 of the space between the first display region D1 and the second display region D2 is illustrated.

Also, FIG. 1 illustrates an example in which a person H0 exists in the inner region R0. However, as described in detail later, multiple persons or no persons may also exist in the inner region R0. Also, FIG. 1 illustrates an example in which a person H1 exists in the outer region R1. However, as described in detail later, multiple persons or no persons may also exist in the outer region R1.

Note that in the following, for the sake of convenience, the near side of plane of the page is treated as the "front", while the far side is treated as the "rear". Referring to FIG. 1, the first display region D1 exists in front of the second display region D2 (the second display region D2 exists behind the first display region D1). For this reason, in the case in which the person H0 existing in the inner region R0 is facing to the front, the first display region (hereinafter also called the "foreground") D1 is visible, and in the case of facing to the rear, the second display region (hereinafter also called the "background") D2 is visible.

Furthermore, referring to FIG. 1, the person H1 existing in the outer region R1 exists in front of the foreground D1. Herein, this specification describes an example in which a screen exists in the foreground D1 (hereinafter also called the "foreground screen") while also a screen exists in the background D2 (hereinafter also called the "background screen"), and the projector 30-1 displays the foreground D1 by projecting light onto the foreground screen while also the projector 30-2 displays the background D2 by projecting light onto the background screen.

Consequently, from the point of view of the person H1, the person H0 existing in the inner region R0 and the background D2 are screened by the foreground D1. For this reason, in the hypothetical case in which the foreground D1 does not transmit light, a situation may occur in which the person H0 and the background D2 are not visible to the person H1.

This specification primarily anticipates a case in which a screen having a property of transmitting light through the foreground D1 (hereinafter also called the "transmissive screen") exists, and the background D2 is visible through the foreground D1. For this reason, the person H1 is able to see not only the foreground D1, but also the person H0 and the background D2. Additionally, as illustrated in FIG. 1, in the case in which the person H1 uses an imaging function of the terminal 20 to capture an image of the person H0, the person H0 and the background D2 may be captured through the foreground D1.

Also, this specification primarily anticipates a case in which an image is captured by the imaging function of the terminal 20 carried by the person H1. However, an image may also be captured by an imaging function of something other than the terminal 20 carried by the person H1. For example, in the case in which a camera is installed in the outer region R1, an image may be captured by the imaging function of the camera. In such a case, the person H1 may or may not exist in the outer region R1.

Note that the foreground screen existing in the foreground D1 preferably is a screen (hereinafter also called a "semi-transmissive screen") having a property of transmitting light while also having light projected thereon by the projection of light from the projector 30-1. Herein, the semi-transmissive screen may include material of any quality. For example, the semi-transmissive screen may include a semi-transparent film, a mesh material, or a net-like face (such as a screen door, for example).

On the other hand, the background screen existing in the background D2 may be a screen of any type. In other words, the background screen existing in the background D2 may be a screen having a property of not transmitting light (hereinafter also called a "non-transmissive screen"), or may be a transmissive screen (such as a semi-transmissive screen, for example).

This specification describes an example in which the foreground D1 is displayed by the projector 30-1 projecting light onto the foreground screen, while in addition, the background D2 is displayed by the projector 30-2 projecting light onto the background screen. However, the display of each of the foreground D1 and the background D2 may be achieved in any way.

For example, the projector 30-1 may also be a hologram projector that shows a hologram in the foreground D1. In this case, the foreground screen does not have to exist in the foreground D1. Similarly, the projector 30-2 may also be a hologram projector that shows a hologram in the background D2. In this case, the background screen does not have to exist in the background D2.

Instead of the projector 30-1 and the foreground screen, any of various types of display apparatus that present a display in the foreground D1 may be used. Similarly, instead of the projector 30-2 and the background screen, any of various types of display apparatus that present a display in the background D2 may be used. The type of display apparatus is not particularly limited, and may be a liquid crystal display, an organic electro-luminescence (EL) display, or another display. The display apparatus may also be a display having a property of transmitting light (transmissive display).

Note that this specification primarily deals with the space sandwiched by the foreground D1 and the background D2 as an example of the space between the foreground D1 and the background D2. However, the space between the foreground D1 and the background D2 does not strictly have to be the space sandwiched by the foreground D1 and the background D2. For example, the space between the foreground D1 and the background D2 may be all or part of the space screened by the foreground D1 as seen from the person H1 existing in the outer region R1.

The sensor 40 detects the position of a person existing in a detectable range. Herein, the type of the sensor 40 is not particularly limited. For example, the sensor 40 may be a visible-light camera, an infrared sensor, an ultrasonic sensor, a millimeter-wave radar, or another sensor. Note that this specification primarily anticipates a case in which the sensor 40 is a depth sensor, and a three-dimensional position of a person including the distance from the sensor 40 to the person is detected by the sensor 40.

The detectable range of the sensor 40 includes at least the inner region R0. Also, this specification primarily anticipates a case in which the detectable range of the sensor 40 additionally includes the outer region R1. A result of the detection by the sensor 40 is provided to the display control apparatus 10 and used for control by the display control apparatus 10.

The above describes an exemplary configuration of the display control system 1 according to the present embodiment.

[1.2. Exemplary Functional Configuration]

Figure 2:
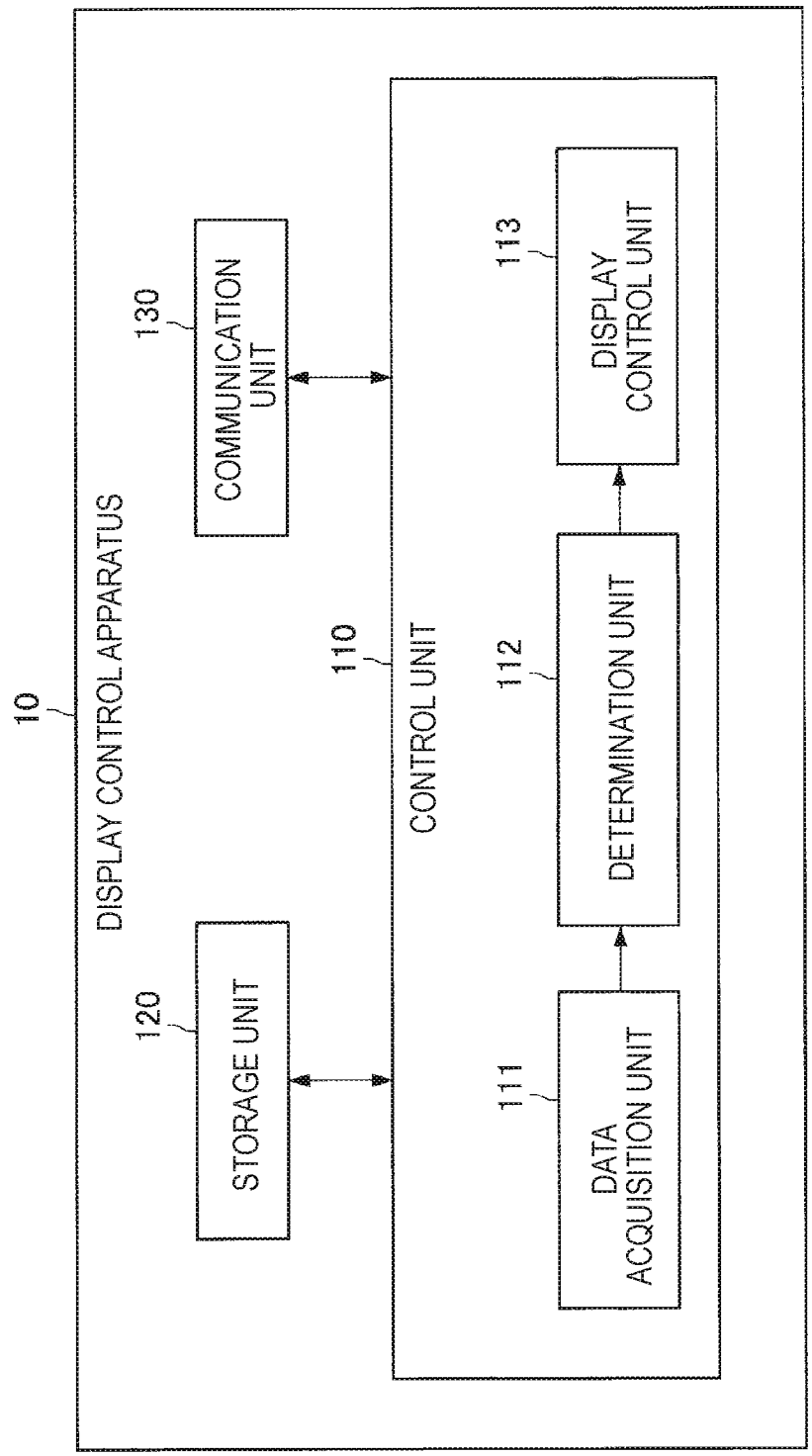
FIG. 2 is a block diagram illustrating an exemplary functional configuration of a display control apparatus according to the embodiment.

Next, an exemplary functional configuration of the display control apparatus 10 according to the present embodiment will be described. FIG. 2 is a block diagram illustrating an exemplary functional configuration of the display control apparatus 10 according to the present embodiment. As illustrated in FIG. 2, the display control apparatus 10 is provided with a control unit 110, a storage unit 120, and a communication unit 130. Hereinafter, these function blocks provided in the display control apparatus 10 will be described.

The control unit 110 controls each unit of the display control apparatus 10. Note that the control unit 110 may include a processing apparatus such as a central processing unit (CPU) or the like, for example. In the case in which the control unit 110 includes a processing apparatus such as a CPU, such a processing apparatus may include an electronic circuit. As illustrated in FIG. 2, the control unit 110 includes a data acquisition unit 111, a determination unit 112, and a display control unit 113. These blocks included in the control unit 110 will be described in detail later.

The storage unit 120 is a recording device that stores programs executed by the control unit 110 and data needed to execute the programs. Also, the storage unit 120 temporarily stores data for calculations by the control unit 110. Note that the storage unit 120 may be a magnetic storage device, a semiconductor storage device, an optical storage device, or a magneto-optical storage device.

The communication unit 130 includes a function of communicating with the terminal 20 carried by the person H1. For example, the communication unit 130 includes a communication interface. For example, the communication unit 130 is able to communicate with the terminal 20 carried by the person H1 over the network 931 (FIG. 1).

The above describes an exemplary functional configuration of the display control apparatus 10 according to the present embodiment.

[1.3. Detailed Functions of Display Control System]

Next, detailed functions of the display control system 1 will be described.

(1.3.1. Content Differentiation)

The display control unit 113 controls the display of the foreground D1 and also controls the display of the background D2. Herein, the control of the display of the foreground D1 may include the control of the display of first content (hereinafter also called "foreground content") in the foreground D1. However, the control of the display of the foreground D1 is not limited to such an example. For example, the control of the display of the foreground D1 may also include control for not displaying any foreground content at all in the foreground D1.

Also, the control of the display of the background D2 may include the control of the display of second content (hereinafter also called "background content"). However, the control of the display of the background D2 is not limited to such an example. For example, the control of the display of the background D2 may also include control for not displaying any background content at all in the background D2.

Note that this specification primarily anticipates a case in which the foreground content is a moving image. However, the foreground content is not limited to a moving image. For example, the foreground content may also be a still image. Similarly, this specification primarily anticipates a case in which the background content is a moving image. However, the background content is not limited to a moving image. For example, the background content may also be a still image.

The foreground content displayed in the foreground D1 may include foreground content to show to the person H0 existing in the inner region R0. Alternatively, the foreground content displayed in the foreground D1 may include foreground content to show to the person H1 existing in the outer region R1. Which is to be displayed as the foreground content in the foreground D1 preferably is differentiated according to the situation (it is preferable to perform content differentiation).

Also, the background content displayed in the background D2 may include background content to show to the person H0 existing in the inner region R0. Alternatively, the background content displayed in the background D2 may include background content to show to the person H1 existing in the outer region R1. Which is to be displayed as the background content in the background D2 preferably is differentiated according to the situation (it is preferable to perform content differentiation).

Hereinafter, the foreground content to show to the person H0 existing in the inner region R0 and the background content to show to the person H0 existing in the inner region R0 will be treated as the same content, and each piece of content will be designated "inward content". However, the foreground content to show to the person H0 existing in the inner region R0 and the background content to show to the person H0 existing in the inner region R0 may also be different content.

Additionally, hereinafter, the foreground content to show to the person H1 existing in the outer region R1 and the background content to show to the person H1 existing in the outer region R1 will be treated as the same content, and each piece of content will be designated "outward content". However, the foreground content to show to the person H1 existing in the outer region R1 and the background content to show to the person H1 existing in the outer region R1 may also be different content.

Figure 3:
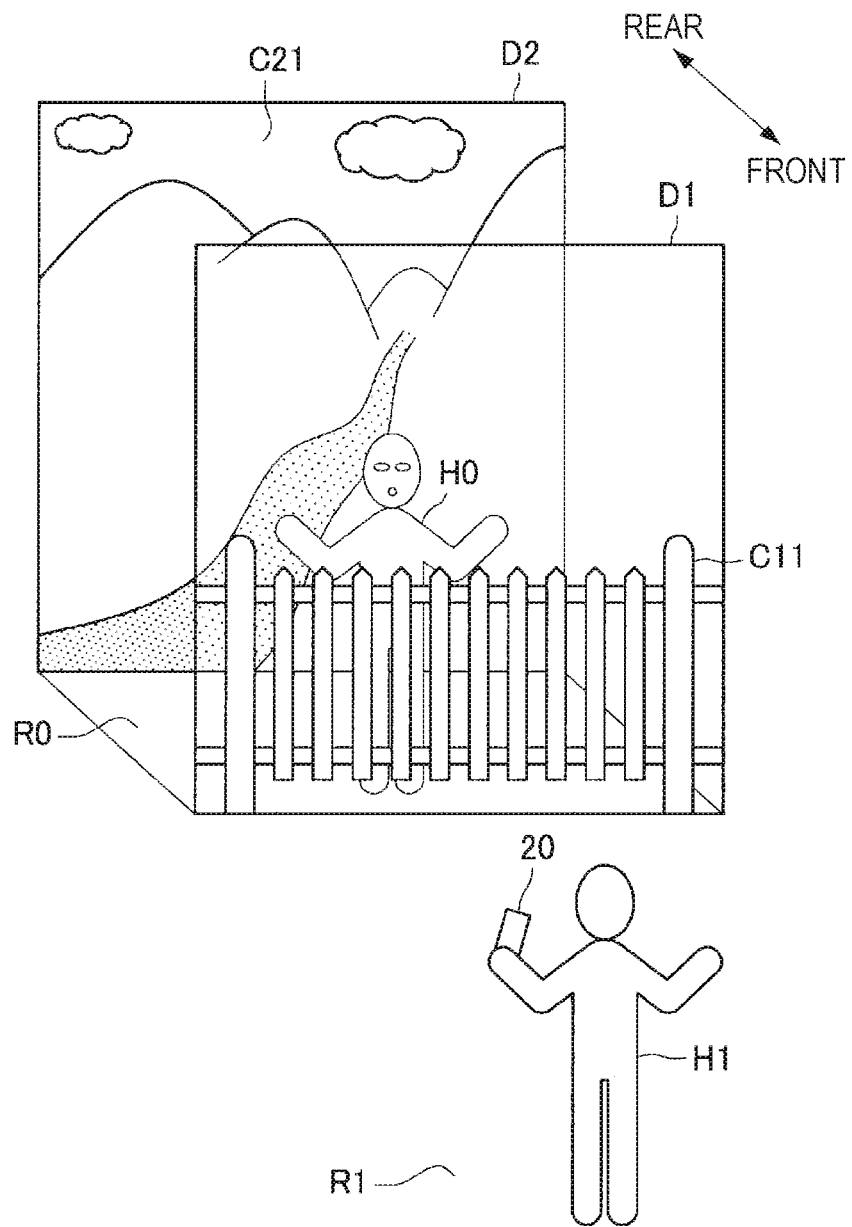
FIG. 3 is a diagram for explaining one example of content differentiation.

Hereinafter, such content differentiation will be described in detail. FIG. 3 is a diagram for explaining one example of content differentiation. First, as described above, the position of a person existing in the detectable range is detected by the sensor 40. More specifically, the three-dimensional position of a person including the distance from the sensor 40 to the person is detected by the sensor 40. The data acquisition unit 111 acquires such a detection result from the sensor 40.

The determination unit 112 determines whether or not a person exists in the inner region R0 on the basis of the detection result from the sensor 40. At this point, the display control unit 113 preferably controls the display of each of the foreground D1 and the background D2 according to whether or not a person exists in the inner region R0. With this arrangement, in the case in which a person exists in the inner region R0, the display control unit 113 becomes able to present content such that the person is drawn to the content more strongly.

In addition, the display control unit 113 preferably controls the display of each of the foreground D1 and the background D2 additionally according to whether or not a person exists in the outer region R1. With this arrangement, in the case in which a person exists in each of the inner region R0 and the outer region R1, the display control unit 113 becomes able to present content such that each person is drawn to the content more strongly.

Additionally, the determination unit 112 is also able to determine the direction of a person on the basis of the detection result from the sensor 40. Subsequently, in the case in which a person exists in the inner region R0, the display control unit 113 is able to control the display of each of the foreground D1 and the background D2 according to the direction of the person.

Herein, the direction of a person is not limited, but in the following description, facing to the front and facing to the rear will be given as specific examples of the direction of a person. In other words, in the case in which a person exists in the inner region R0, the display control unit 113 is able to control the display of each of the foreground D1 and the background D2 according to which of the foreground D1 and the background D2 the person is facing.

As an example, FIG. 3 illustrates a case in which the person H0 facing to the front exists in the inner region R0, and the person H1 exists in the outer region R1. In such a case, there is a high probability that the person H0 existing in the inner region R0 is looking at the foreground D1. Consequently, the display control unit 113 preferably causes inward content C11 to be displayed in the foreground D1, and causes outward content C21 to be displayed in the background D2.

In such a case, the person H1 is able to look through the foreground D1 to see the outward content C21 displayed in the background D2. At this time, the display control unit 113 may raise the brightness of the outward content C21 displayed in the background D2 higher than the brightness of the inward content C11 displayed in the foreground D1 (or raise the contrast of the outward content C21 displayed in the background D2 higher than the contrast of the inward content C11 displayed in the foreground D1), and thereby make the outward content C21 displayed in the background D2 easier to see for the person H1.

Note that in the example illustrated in FIG. 3, the inward content C11 is illustrated as an image of a fence, but the inward content C11 may be any kind of image. Similarly, in the example illustrated in FIG. 3, the outward content C21 is illustrated as an image of a landscape, but the outward content C21 may be any kind of image.

The example of content differentiation is not limited to the example illustrated in FIG. 3. In the following, each example of content differentiation will be described. FIG. 4 is a table summarizing each example of content differentiation. In the table illustrated in FIG. 4, the upper-left cell indicates the case in which the person H0 facing to the front exists in the inner region R0, and additionally, the person H1 exists in the outer region R1 (the case illustrated in FIG. 3). At this time, as described with reference to FIG. 3, the display control unit 113 preferably causes the inward content C11 to be displayed in the foreground D1, and causes the outward content C21 to be displayed in the background D2.

In the table illustrated in FIG. 4, the upper-middle cell indicates the case in which the person H0 facing to the rear exists in the inner region R0, and additionally, the person H1 exists in the outer region R1. In such a case, there is a high probability that the person H0 existing in the inner region R0 is looking at the background D2. Consequently, the display control unit 113 preferably causes inward content to be displayed in the background D2, and causes outward content to be displayed in the foreground D1.

In such a case, the person H1 is able to see the outward content displayed in the foreground D1. At this time, the display control unit 113 may raise the brightness of the outward content displayed in the foreground D1 higher than the brightness of the inward content displayed in the background D2 (or raise the contrast of the outward content displayed in the foreground D1 higher than the contrast of the inward content displayed in the background D2), and thereby make the outward content displayed in the foreground D1 easier to see for the person H1.

In the table illustrated in FIG. 4, the upper-right cell indicates the case in which a person does not exist in the inner region R0, and additionally, the person H1 exists in the outer region R1. In such a case, there is a high probability that both the foreground D1 and the background D2 are seen by the person H1 existing in the outer region R1. Consequently, the display control unit 113 preferably causes outward content to be displayed in each of the foreground D1 and the background D2. The outward content displayed in the foreground D1 and the outward content displayed in the background D2 may be the same or different.

In the case in which the outward content displayed in the foreground D1 and the outward content displayed in the background D2 are different, the pieces of outward content may be unrelated to each other, but it is desirable for the pieces of outward content to be related in some way. For example, the outward content displayed in the background D2 may be an image of a tree, and the outward content displayed in the foreground D1 may be an image of leaves falling from the tree. If the pieces of outward content are related to each other in this way, it becomes possible to show the person H1 an image with a sense of unity.

In the table illustrated in FIG. 4, the lower cell indicates the case in which the person H0 exists in the inner region R0, and additionally, a person does not exist in the outer region R1. In such a case, there is a high probability that both the foreground D1 and the background D2 are seen by the person H0 existing in the inner region R0. Consequently, the display control unit 113 preferably causes inward content to be displayed in each of the foreground D1 and the background D2. The inward content displayed in the foreground D1 and the inward content displayed in the background D2 may be the same or different.

In the case in which the inward content displayed in the foreground D1 and the inward content displayed in the background D2 are different, the pieces of inward content may be unrelated to each other, but it is desirable for the pieces of inward content to be related in some way. For example, the inward content displayed in the background D2 may be an image of a landscape seen in a certain direction from the inside of a vehicle, and the inward content displayed in the foreground D1 may be an image of a landscape seen in the opposite direction of the certain direction from the inside of the vehicle. If the pieces of inward content are related to each other in this way, it becomes possible to show the person H0 an image with a sense of unity.

Next, exemplary operations of content differentiation will be described.

FIG. 5 is a flowchart illustrating exemplary operations of content differentiation. As illustrated in FIG. 5, as described above, the position of a person existing in the detectable range is detected by the sensor 40. More specifically, the three-dimensional position of a person including the distance from the sensor 40 to the person is detected by the sensor 40. The data acquisition unit 111 acquires such a detection result from the sensor 40. Next, the determination unit 112 determines whether or not a person exists in the inner region R0 on the basis of the detection result from the sensor 40 (S11).

In the case in which a person does not exist in the inner region R0 ("No" in S11), the display control unit 113 causes outward content to be displayed in each of the foreground D1 and the background D2 (S17). At this point, the outward content displayed in the foreground D1 and the outward content displayed in the background D2 may be the same or different. When the display control unit 113 causes outward content to be displayed in each of the foreground D1 and the background D2, the control unit 110 proceeds to S11.

On the other hand, in the case in which a person exists in the inner region R0 ("Yes" in S11), the display control unit 113 proceeds to S12.

Next, the determination unit 112 determines whether or not a person exists in the outer region R1 on the basis of the detection result from the sensor 40 (S12). In the case in which a person does not exist in the outer region R1 ("No" in S12), the display control unit 113 causes inward content to be displayed in each of the foreground D1 and the background D2 (S16). At this point, the inward content displayed in the foreground D1 and the inward content displayed in the background D2 may be the same or different. When the display control unit 113 causes inward content to be displayed in each of the foreground D1 and the background D2, the control unit 110 proceeds to S11.

On the other hand, in the case in which a person exists in the outer region R1 ("Yes" in S12), the display control unit 113 proceeds to S13.

Next, the determination unit 112 determines whether or not the person existing in the inner region R0 is facing to the front, on the basis of the detection result from the sensor 40 (S13). In the case in which the person existing in the inner region R0 is facing to the rear ("No" in S13), the display control unit 113 causes outward content to be displayed in the foreground D1, and also causes inward content to be displayed in the background D2 (S15). When the display control unit 113 causes outward content to be displayed in the foreground D1 and causes inward content to be displayed in the background D2, the control unit 110 proceeds to S11.

On the other hand, in the case in which the person existing in the inner region R0 is facing to the front ("Yes" in S13), the display control unit 113 causes inward content to be displayed in the foreground D1, and also causes outward content to be displayed in the background D2 (S14). When the display control unit 113 causes inward content to be displayed in the foreground D1 and causes outward content to be displayed in the background D2, the control unit 110 proceeds to S11.

The above describes content differentiation.

(1.3.2. Case in which Multiple Persons Exist)

The above primarily describes an example in which one person H1 exists in the inner region R0. However, a case in which multiple persons exist in the inner region R0 is also anticipated. In such a case, the display of each of the foreground D1 and the background D2 preferably is controlled on the basis of whether more persons are facing the foreground D1 or the background D2. With this arrangement, it becomes possible to present content such that more persons are drawn to the content strongly.

Figure 6:
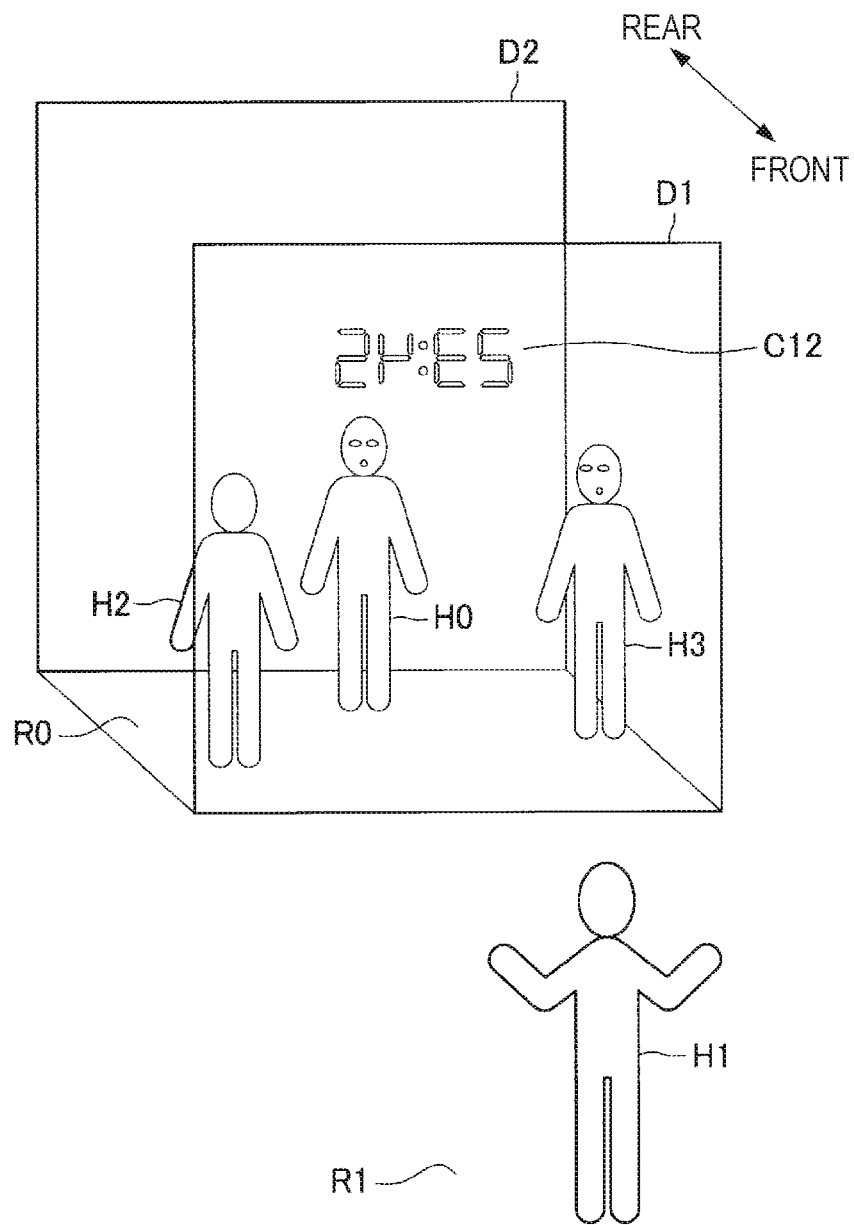
FIG. 6 is a diagram for explaining a case in which multiple persons exist in an inner region.

FIG. 6 is a diagram for explaining a case in which multiple persons exist in the inner region R0. Referring to FIG. 6, besides the person H0, a person H2 and a person H3 exist in the inner region R0. In other words, in the example illustrated in FIG. 6, three persons exist in the inner region R0. Additionally, the person H0 and the person H3 are facing the foreground D1, while the person H2 is facing the background D2. However, the number of persons existing in the inner region R0 and the direction in which each person faces are not limited.

In the example illustrated in FIG. 6, more persons are facing the foreground D1 than the background D2. Accordingly, the display control unit 113 preferably causes inward content C12 to be displayed in the foreground D1 toward which more persons are facing. On the other hand, in the hypothetical case in which more persons are facing the background D2 than the foreground D1, it is preferable for the display control unit 113 to cause the inward content C12 to be displayed in the background D2. Note that in the example illustrated in FIG. 6, the inward content C12 is illustrated as an image of a digital clock, but the inward content C12 may be any kind of image.

Also, in the example illustrated in FIG. 6, no content at all is being displayed in the background D2. However, in the example illustrated in FIG. 6, the person H1 also exists in the outer region R1. In this way, in the case in which the person H1 also exists in the outer region R1, the display control unit 113 may also cause outward content to be displayed in the background D2. With this arrangement, the person H1 existing in the outer region R1 becomes able to look through the foreground D1 and see the outward content displayed in the background D2.

Also, a case in which content operable by a person is displayed is also anticipated. In such a case, the display region of the operable content (the display region to be operated) preferably is decided on the basis of whether more persons are facing the foreground D1 or the background D2. With this arrangement, it becomes possible to present content such that more persons are drawn to the content strongly.

Figure 7:
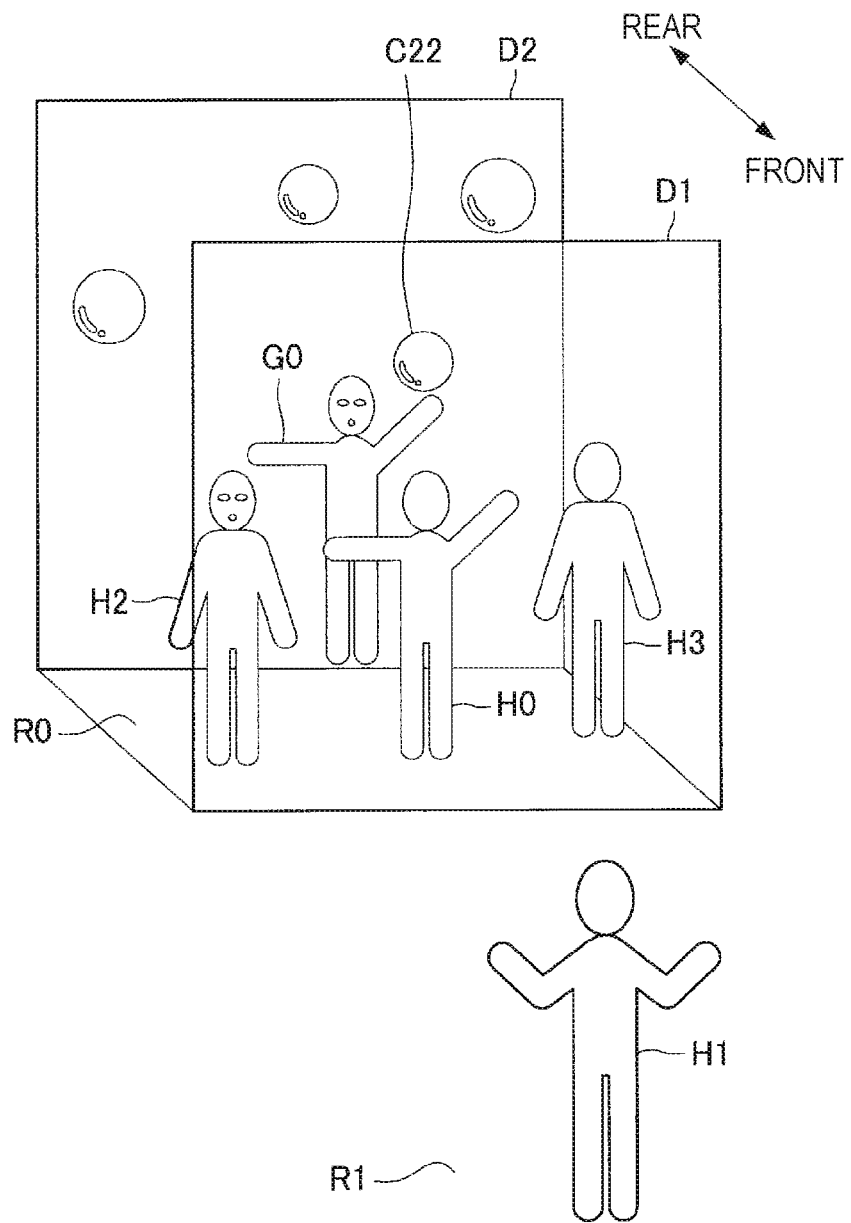
FIG. 7 is a diagram for explaining another case in which multiple persons exist in the inner region.

FIG. 7 is a diagram for explaining another case in which multiple persons exist in the inner region R0. Referring to FIG. 7, besides the person H0, the person H2 and the person H3 exist in the inner region R0. In other words, in the example illustrated in FIG. 7, three persons exist in the inner region R0. Additionally, the person H0 and the person H3 are facing the background D2, while the person H2 is facing the foreground D1. However, the number of persons existing in the inner region R0 and the direction in which each person faces are not limited.

In the example illustrated in FIG. 7, more persons are facing the background D2 than the foreground D1. Accordingly, the display control unit 113 preferably causes operable content C22 to be displayed in the background D2 toward which more persons are facing (it is preferable to decide the background D2 as the display region to be operated). On the other hand, in the hypothetical case in which more persons are facing the foreground D1 than the background D2, it is preferable for the display control unit 113 to cause the operable content C22 to be displayed in the foreground D1.

Note that in the example illustrated in FIG. 7, the operable content C22 is illustrated as an example of a ball, and a captured image G0 of the person H0 from the sensor 40 is displayed in the background D2. Additionally, the operable content C22 is displayed such that the ball rebounds upon colliding with the captured image G0. However, the operable content C22 may be any kind of image. For example, the operable content C22 may also be a button or the like that executes a predetermined operation when pressed by a person existing in the inner region R0.

Also, in the example illustrated in FIG. 7, no content at all is being displayed in the foreground D1. However, in the example illustrated in FIG. 7, the person H1 also exists in the outer region R1. In this way, in the case in which the person H1 also exists in the outer region R1, the display control unit 113 may also cause outward content to be displayed in the foreground D1. With this arrangement, the person H1 existing in the outer region R1 becomes able to see the outward content displayed in the foreground D1.

The above describes a case in which multiple persons exist in the inner region R0.

(1.3.3. Complementing and Utilizing Screened Region)

At this point, the case in which a person exists in the inner region R0 is presumed. In such a case, all or part of the background D2 may be screened by the person existing in the inner region R0. At this point, among the background D2, the region screened by a person existing in the inner region R0 is also called the "screened region". In the following, after describing a technique of complementing the screened region, a technique of utilizing the screened region will be described.

Figure 8:
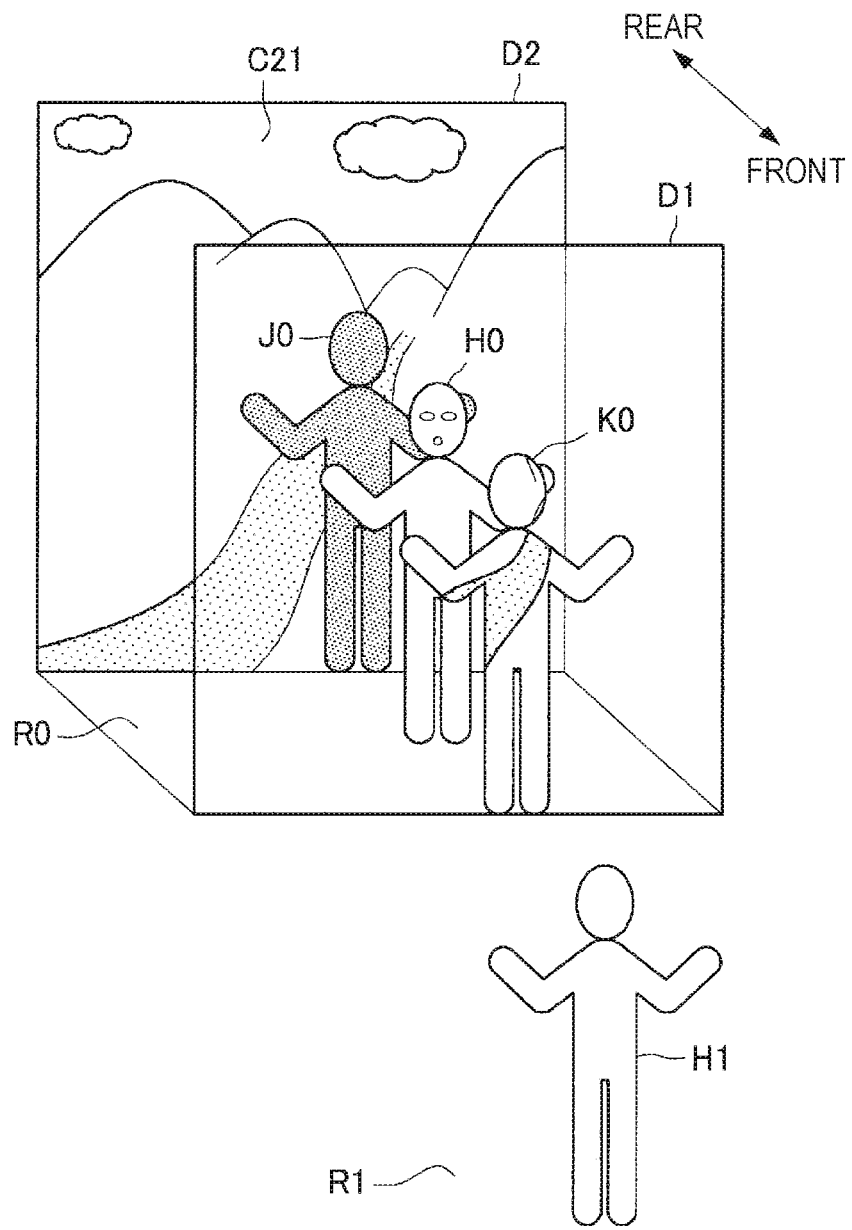
FIG. 8 is a diagram for explaining an example of a technique of complementing a screened region.

FIG. 8 is a diagram for explaining an example of a technique of complementing the screened region. As illustrated in FIG. 8, the outward content C21 is being displayed in the background D2. Also, the person H0 exists in the inner region R0, while the person H1 exists in the outer region R1. Accordingly, from the perspective of the person H1 existing in the outer region R1, a part of the background D2 is screened by the person H0 existing in the inner region R0 as a screened region J0.

Consequently, the display control unit 113 preferably causes the screened region J0 in the outward content C21 to be displayed in the foreground D1 as a duplicate region K0. With this arrangement, by looking at the region other than the screened region J0 in the background D2 and the duplicate region K0 that complements the screened region J0, the person H1 existing in the outer region R1 becomes able to see the whole of the outward content C21.

Note that the position of the screened region J0 in the background D2 may be computed by the display control unit 113. In other words, the display control unit 113 may compute the position of the screened region J0 on the basis of a detection result from the sensor 40. More specifically, the display control unit 113 may compute the position of the screened region J0 on the basis of the position of the person H0 existing in the inner region R0 and the position of the person H1 existing in the outer region R1. At this time, as illustrated in FIG. 8, the computation of the position of the screened region J0 may also take into account skeletal information about the person H0 detected by the sensor 40.

Figure 9:
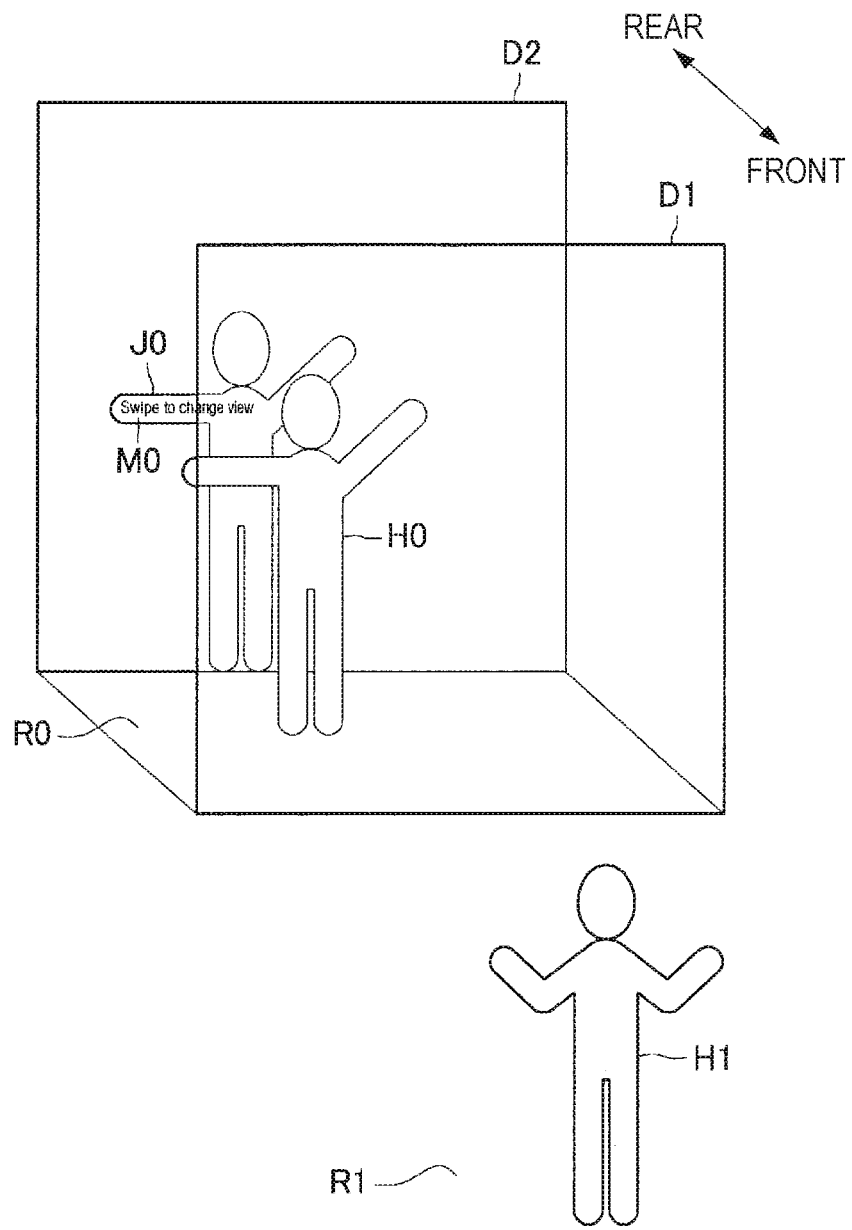
FIG. 9 is a diagram for explaining an example of a technique of utilizing the screened region.

FIG. 9 is a diagram for explaining an example of a technique of utilizing the screened region. As illustrated in FIG. 9, the person H0 exists in the inner region R0, while the person H1 exists in the outer region R1. Accordingly, from the perspective of the person H1 existing in the outer region R1, a part of the background D2 is screened by the person H0 existing in the inner region R0 as a screened region J0.

Consequently, the display control unit 113 preferably causes predetermined content to be displayed in the screened region J0 in the background D2. The predetermined content is not particularly limited, but may be content that is necessary to the person H0 existing in the inner region R0, but unnecessary to the person H1 existing in the outer region R1. With this arrangement, the screened region J0 may be utilized effectively. In FIG. 9, as an example of the predetermined content, a character string M0 explaining an operation on the background D2 is displayed in the screened region J0 in the background D2.

Note that, as described with reference to FIG. 8, the position of the screened region J0 in the background D2 may be computed by the display control unit 113. Referring to FIG. 9, no content at all is being displayed in the region other than the screened region J0 in the background D2, but inward content may be displayed in the region other than the screened region J0 in the background D2. Also, referring to FIG. 9, no content at all is being displayed in the foreground D1, but outward content may be displayed in the foreground D1.

The above describes complementing and utilizing the screened region J0.

(1.3.4. Control of Parameters)

Similarly, the case in which a person exists in the inner region R0 is presumed. In such a case, the display control unit 113 preferably controls parameters for each of foreground content and background content according to the position of a person existing in the inner region R0. With this arrangement, it becomes possible to show the area around the position of the person existing in the inner region R0 in focus for a person existing in the outer region R1.

Herein, the parameters are not particularly limited. For example, the parameters may include at least one of an amount of shading or a brightness. For example, in the case in which the parameters include the amount of shading, as the person H0 approaches the foreground D1, the display control unit 113 may decrease the amount of shading in the foreground content and also increase the amount of shading in the background content. Alternatively, in the case in which the parameters include brightness, as the person H0 approaches the foreground D1, the display control unit 113 may increase the brightness of the foreground content and also decrease the brightness of the background content.

In the following description, the amount of shading is given as an example of a parameter controlled by the display control unit 113.

Figure 10:
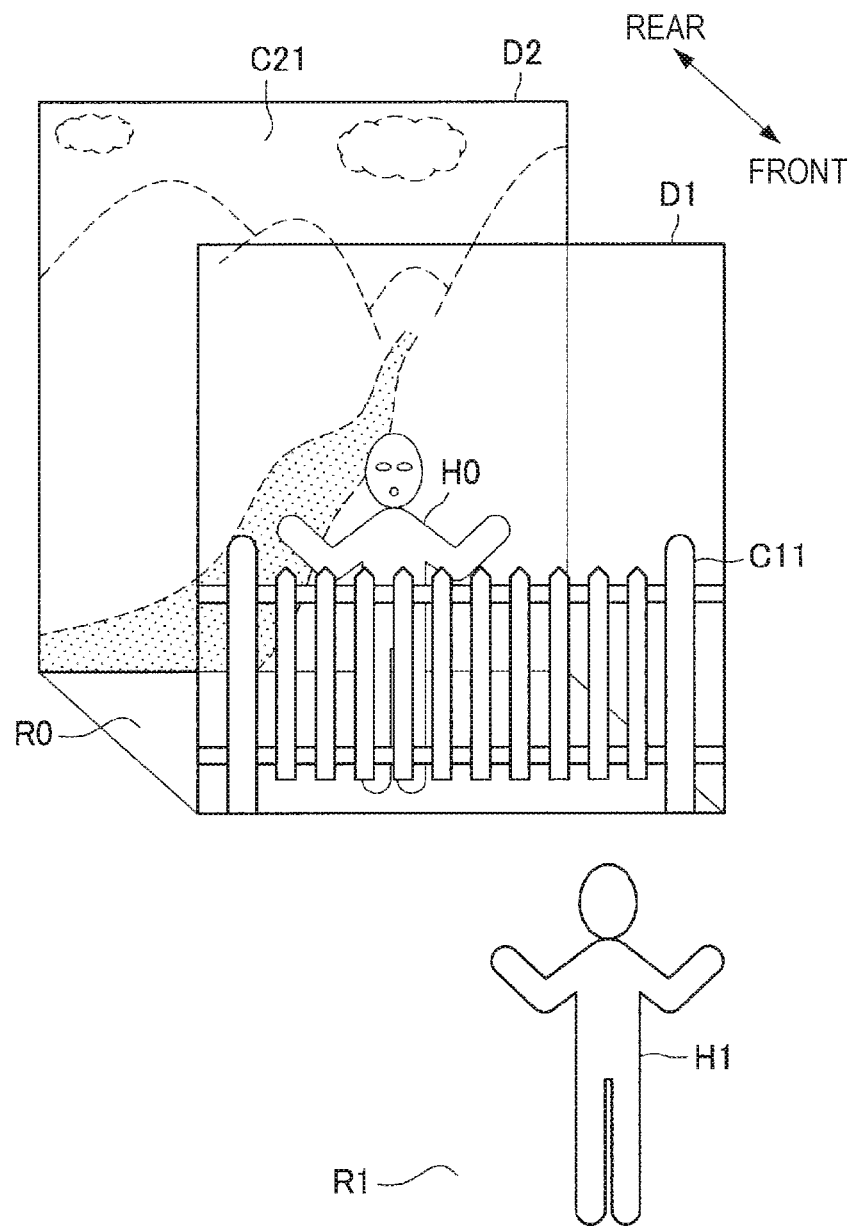
FIG. 10 is a diagram for explaining an example of a technique of controlling an amount of shading for each of foreground content and background content.
Figure 11:
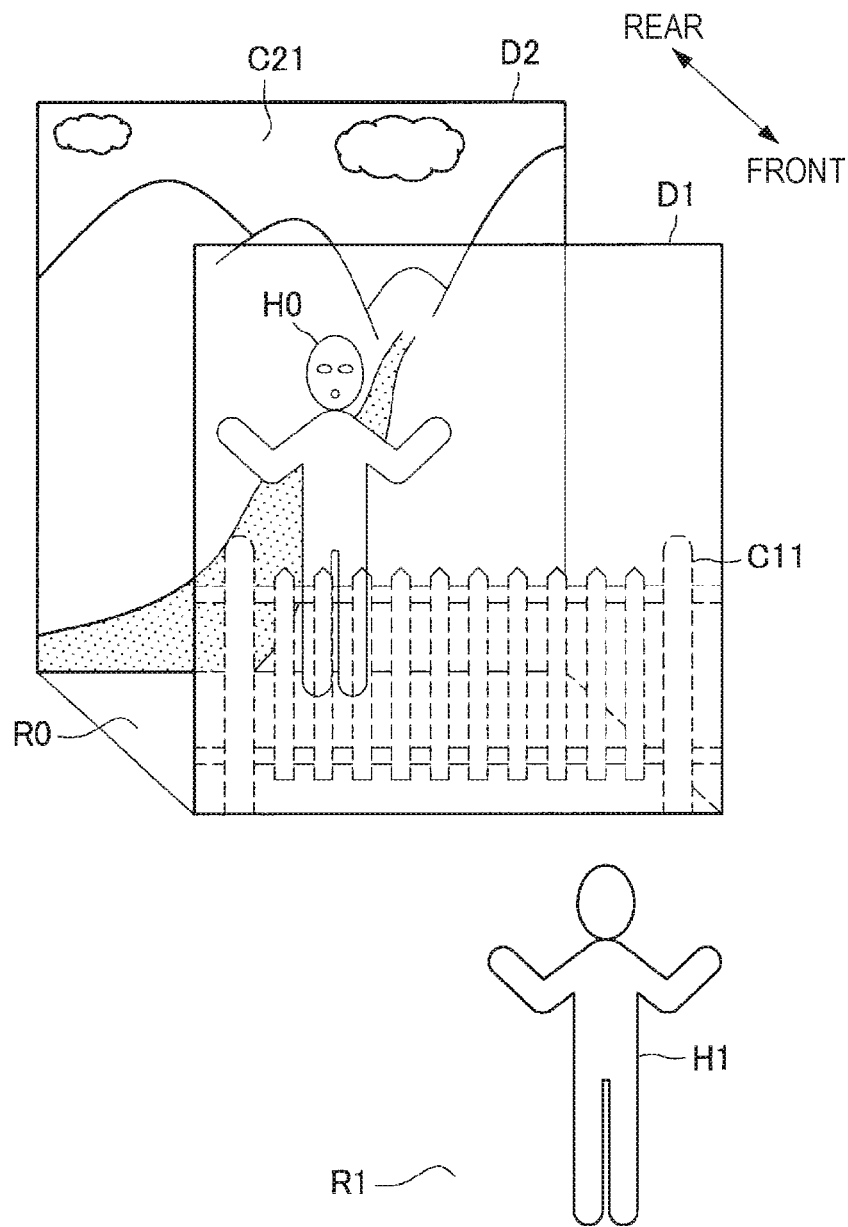
FIG. 11 is a diagram for explaining an example of a technique of controlling an amount of shading for each of foreground content and background content.

FIGS. 10 and 11 are diagrams for explaining an example of a technique of controlling the amount of shading for each of foreground content and background content. Referring to FIGS. 10 and 11, the outward content C21 is displayed in the background D2, and inward content is displayed in the foreground D1. Also, the person H0 exists in the inner region R0, while the person H1 exists in the outer region R1. However, in the example illustrated in FIG. 10, the person H0 exists close to the foreground D1, while in the example illustrated in FIG. 11, the person H0 exists close to the background D2.

As illustrated in FIG. 10, in the case in which the person H0 exists close to the foreground D1, the display control unit 113 preferably decreases the amount of shading of the content C11 displayed in the foreground D1 and also increases the amount of shading of the content C21 displayed in the background D2. On the other hand, as illustrated in FIG. 11, in the case in which the person H0 exists close to the background D2, the display control unit 113 preferably increases the amount of shading of the content C11 displayed in the foreground D1 and also decreases the amount of shading of the content C21 displayed in the background D2.

The above describes parameters controlled by the display control unit 113.

(1.3.5. Capturing Image of Person Existing in Inner Region)

Similarly, the case in which a person exists in the inner region R0 is presumed. In the case in which a person existing in the inner region R0 is captured by the terminal 20 from the outer region R1, the display of at least one of the foreground D1 or the background D2 preferably is changed for imaging. With this arrangement, the display of at least one of the foreground D1 or the background D2 becomes suitable for imaging. Specifically, in the case in which a predetermined operation performed before imaging is detected, the display control unit 113 preferably changes the display of at least one of the foreground D1 or the background D2 for imaging.

At this point, the predetermined operation performed before imaging is not particularly limited. For example, the predetermined operation performed before imaging may include an operation of launching an application that captures images (hereinafter also called simply the "camera app"). For example, the operation of launching the camera app may be performed on the terminal 20 by the person H1. Alternatively, the predetermined operation performed before imaging may include an operation of pressing a shutter button for imaging. For example, the shutter button for imaging may be provided on the terminal 20 and pressed by the person H1.

Alternatively, the predetermined operation performed before imaging may include an operation of half-pressing the shutter button for imaging. For example, the shutter button for imaging may be provided on the terminal 20 and half-pressed by the person H1. Alternatively, the predetermined operation performed before imaging may include an explicit operation for indicating that imaging is about to be executed. For example, a button for indicating that imaging is about to be executed may be provided on the terminal 20, and the explicit operation may be performed by the person H1 pressing the button.

In the following description, the operation of pressing the shutter button is given as an example of the predetermined operation performed before imaging.

As a first example, in the case in which the operation of pressing the shutter button is detected, the display control unit 113 preferably causes the motion of the foreground content and the background content to stop for a predetermined time. With this arrangement, a reduced possibility of blur occurring in the image captured by the terminal 20 is expected. At this point, the length of the predetermined time during which to stop the motion of each of the foreground content and the background content is not particularly limited.

As a second example, in the case in which the operation of pressing the shutter button is detected, the display control unit 113 may also lower the brightness (decrease the amount of light) of the foreground content. With this arrangement, since the brightness of the foreground content is lowered, there is a higher probability of capturing an image of the person H0 existing in the inner region R0 at a suitable brightness. At this point, the degree to which to lower the brightness of the foreground content is not particularly limited.

As a third example, in the case in which the operation of pressing the shutter button is detected, the display control unit 113 may remove all or part of a region corresponding to an outline of the person H0 existing in the inner region R0 from among the foreground content. With this arrangement, there is a lower probability that the capture of the person H0 existing in the inner region R0 will be obstructed by the foreground content, and there is a higher probability of capturing the person H0 existing in the inner region R0 appropriately in an image. At this point, the region corresponding to the outline of the person H0 is not particularly limited. Hereinafter, this third example will be described specifically.

Figure 12:
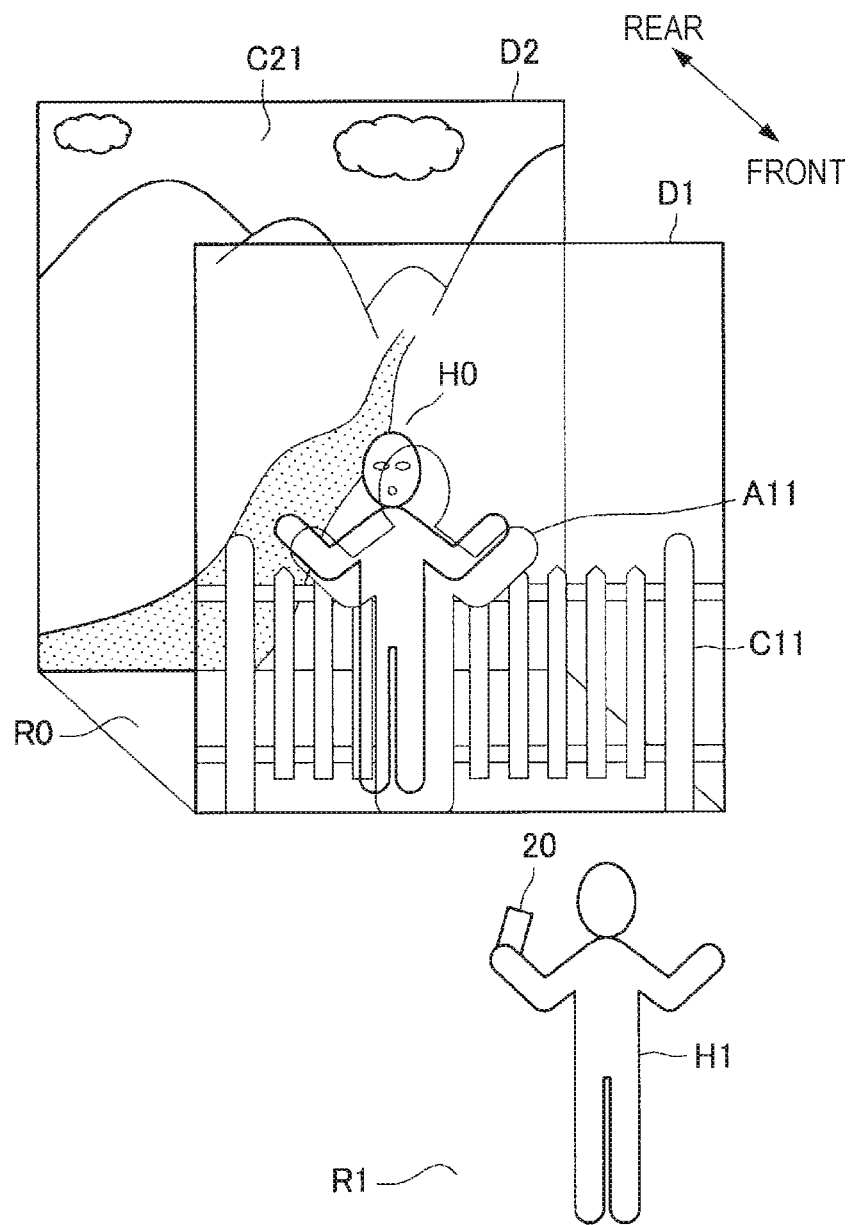
FIG. 12 is a diagram for explaining an example of changing the display of the foreground for imaging.

FIG. 12 is a diagram for explaining an example of changing the display of the foreground D1 for imaging. Referring to FIG. 12, a case in which the person H0 facing to the front exists in the inner region R0 and the person H1 exists in the outer region R1 is illustrated as an example. In such a case, the display control unit 113 preferably causes the inward content C11 to be displayed in the foreground D1, and causes the outward content C21 to be displayed in the background D2. However, the content displayed in each of the foreground D1 and the background D2 is not limited to such an example. For example, in the foreground D1, outward content may be displayed instead of the inward content C11, while in the background D2, inward content may be displayed instead of the outward content C21.

From the perspective of the person H1, it is possible to look at the inward content C11 displayed in the foreground D1 and also look through the foreground D1 to see the outward content C21 displayed in the background D2 and the person H0. When the person H1 presses the shutter button of the terminal 20 at a desired timing for executing imaging, the operation of pressing the shutter button is detected by the terminal 20.

In the case in which the operation of pressing the shutter button is detected, the display control unit 113 may remove a region A11 corresponding to an outline of the person H0 existing in the inner region R0 from among the inward content C11 displayed in the foreground D1. At this point, the region A11 corresponding to the outline of the person H0 is not particularly limited. For example, as illustrated in FIG. 12, the region A11 corresponding to the outline of the person H0 may be a region farther outward by a predetermined width than the region overlapping the person H0 from the perspective of the person H1 from among the inward content C11 displayed in the foreground D1.

As a fourth example, in the case in which the operation of pressing the shutter button is detected, the display control unit 113 may also generate composite content by compositing the foreground content and the background content, and cause the composite content to be displayed in the background D2. With this arrangement, there is a lower probability that the capture of the person H0 existing in the inner region R0 will be obstructed by the foreground content, and there is a higher probability of capturing the person H0 existing in the inner region R0 appropriately in an image. Hereinafter, this fourth example will be described specifically.

Figure 13:
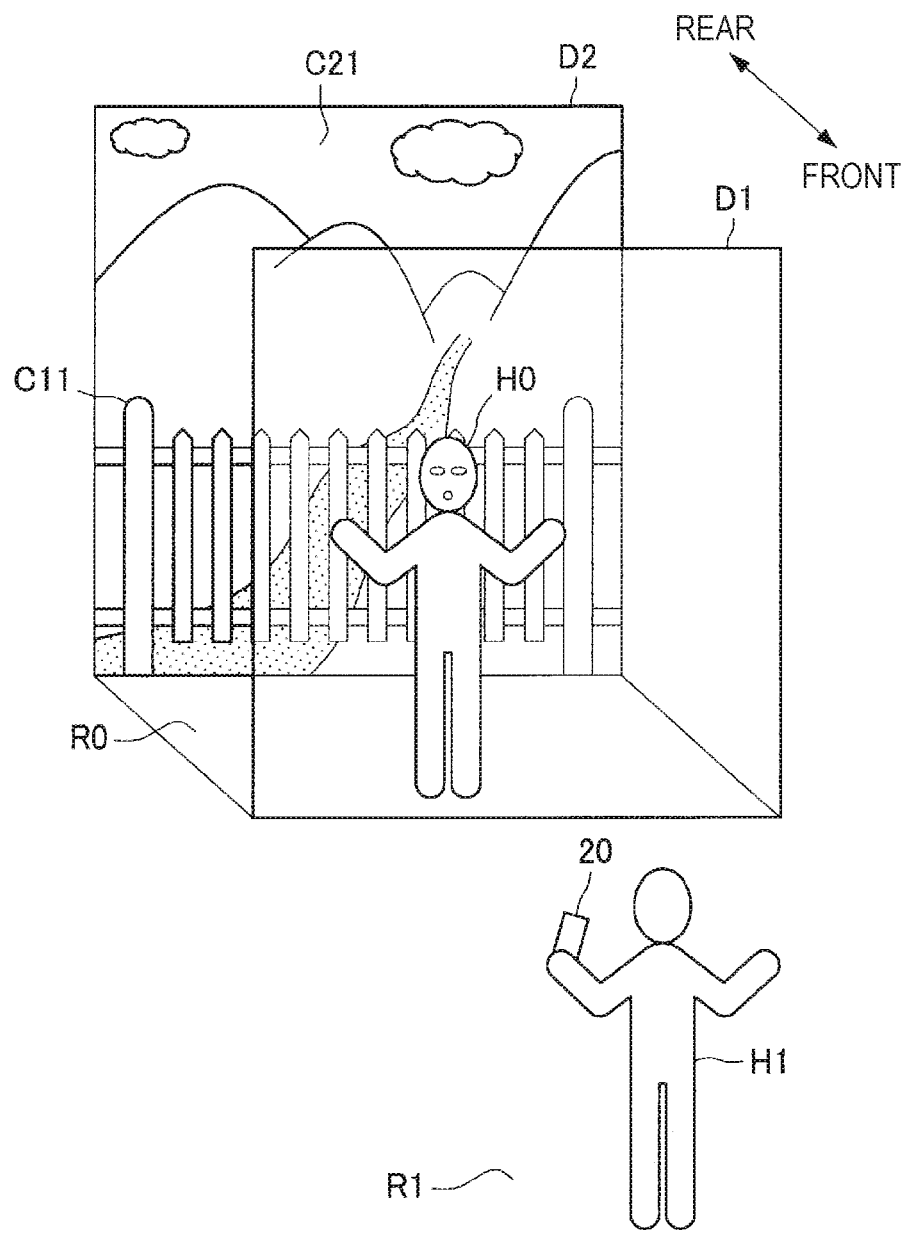
FIG. 13 is a diagram for explaining an example of changing the display of each of the foreground and the background for imaging.

FIG. 13 is a diagram for explaining another example of changing the display of each of the foreground D1 and the background D2 for imaging. Referring to FIG. 13, a case in which the person H0 facing to the front exists in the inner region R0 and the person H1 exists in the outer region R1 is illustrated as an example. When the person H1 presses the shutter button of the terminal 20 at a desired timing for executing imaging, the operation of pressing the shutter button is detected by the terminal 20.

In the case in which the operation of pressing the shutter button is detected, the display control unit 113 preferably generates composite content by compositing the inward content C11 and the outward content C21, and causes the composite content to be displayed in the background D2. At this time, the inward content C11 that had been displayed in the foreground D1 until then is removed by the display control unit 113. With this arrangement, there is a lower probability that the capture of the person H0 existing in the inner region R0 will be obstructed by the inward content C11, and there is a higher probability of capturing the person H0 existing in the inner region R0 appropriately in an image.

As a fifth example, in the case in which the operation of pressing the shutter button is detected, the display control unit 113 may also cause a predetermined image different from the foreground content and the background content to be displayed in at least one of the foreground D1 or the background D2. With this arrangement, since the predetermined image displayed in at least one of the foreground D1 or the background D2 also appears in the image captured by the terminal 20, convenience may be improved. Hereinafter, this fifth example will be described specifically.

Figure 14:
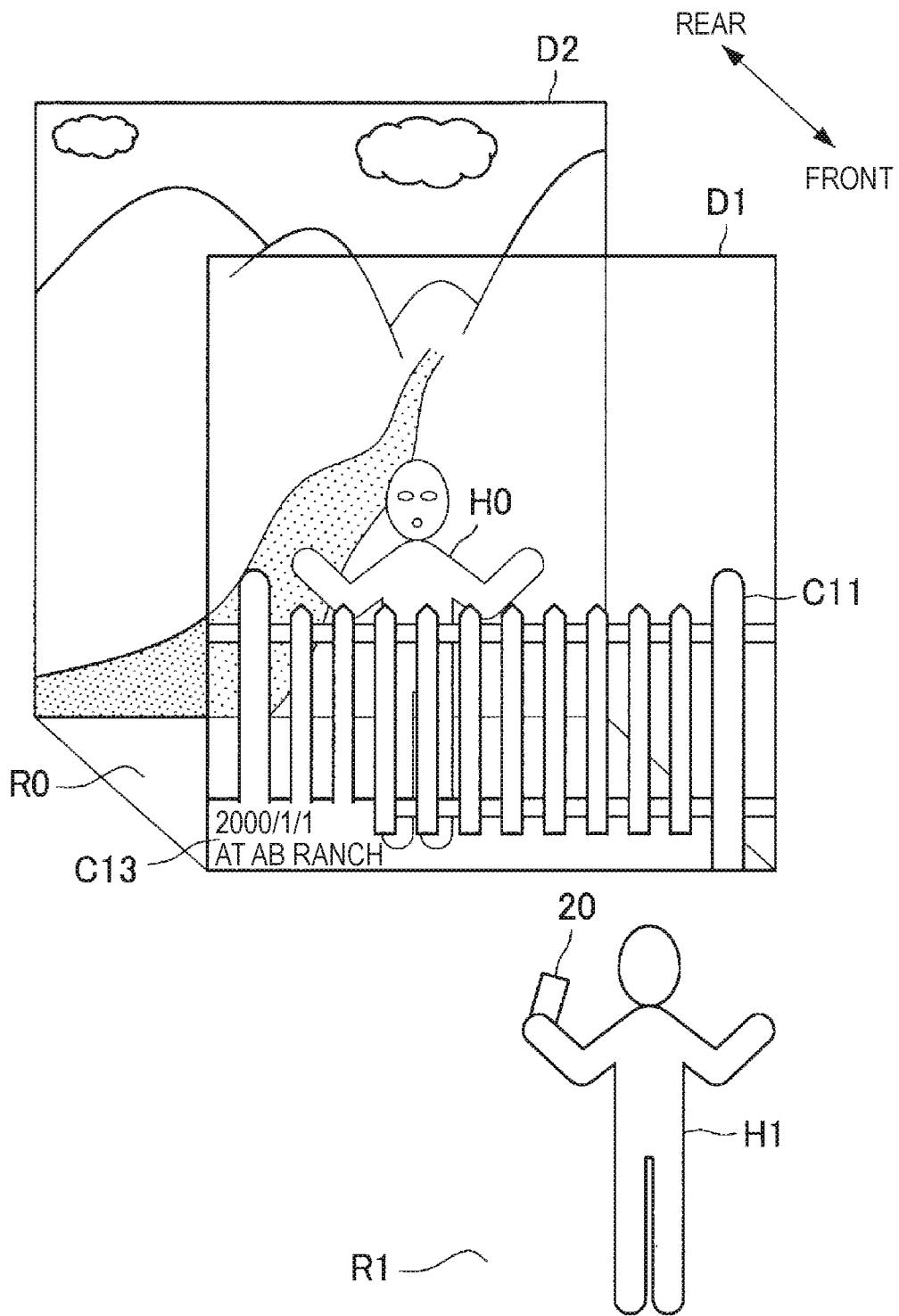
FIG. 14 is a diagram for explaining another example of changing the display of the foreground for imaging.

FIG. 14 is a diagram for explaining another example of changing the display of the foreground D1 for imaging. Referring to FIG. 14, a case in which the person H0 facing to the front exists in the inner region R0 and the person H1 exists in the outer region R1 is illustrated as an example. In such a case, the display control unit 113 preferably causes the inward content C11 to be displayed in the foreground D1, and causes the outward content C21 to be displayed in the background D2. As described with reference to FIG. 12, the content displayed in each of the foreground D1 and the background D2 is not limited to such an example.

In the case in which the operation of pressing the shutter button is detected, the display control unit 113 may cause a predetermined image different from the inward content C11 and the outward content C21 to be displayed in the foreground D1. In FIG. 14, a character string C13 is displayed as an example of the predetermined image, but the predetermined image is not limited to the character string C13. Also, in the example illustrated in FIG. 14, the character string C13 includes the current time and place name, but the character string C13 is not limited to such an example. For example, the character string C13 may also include an event name.

Next, exemplary operations of each of the terminal 20 and the display control apparatus 10 will be described in an example in which the display of at least one of the foreground D1 or the background D2 is changed for imaging. First, the exemplary operations of the terminal 20 will be described in the example in which the display of at least one of the foreground D1 or the background D2 is changed for imaging.

Figure 15:
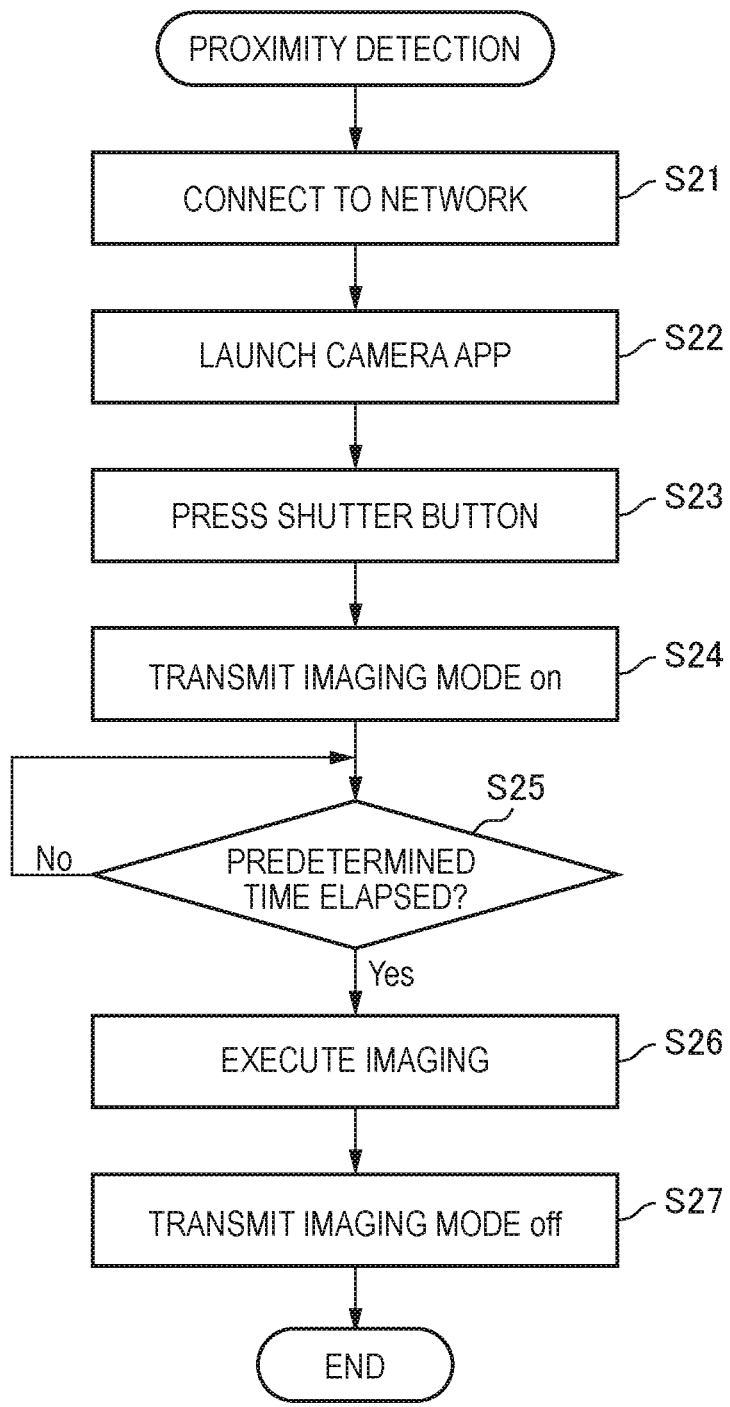
FIG. 15 is a flowchart illustrating exemplary operations of a terminal related to an example of changing the display of at least one of the foreground or the background for imaging.

FIG. 15 is a flowchart illustrating exemplary operations of the terminal 20 related to the example of changing the display of at least one of the foreground D1 or the background D1 for imaging. As illustrated in FIG. 15, the terminal 20 detects a connection to the network 931 (S21), and when an operation of launching the camera app from the person H1 is detected, the terminal 20 launches the camera app (S22). Additionally, when an operation of pressing the shutter button from the person H1 is detected, the terminal 20 transmits information indicating that imaging is about to be executed (hereinafter also called "imaging mode on") to the display control apparatus 10 through the network 931 (S24).

Additionally, the terminal 20 stands by until a predetermined time elapses ("No" in S25), and when the predetermined time elapses ("Yes" in S25), the terminal 20 executes imaging by the imaging function included in the terminal 20 (S26). For example, the person H0 existing in the inner region R0 is imaged by the terminal 20. When imaging ends, the terminal 20 transmits information indicating that imaging has been executed (hereinafter also called "imaging mode off") to the display control apparatus 10 (S27).

Next, exemplary operations of the display control apparatus 10 will be described in the example in which the display of at least one of the foreground D1 or the background D2 is changed for imaging.

Figure 16:
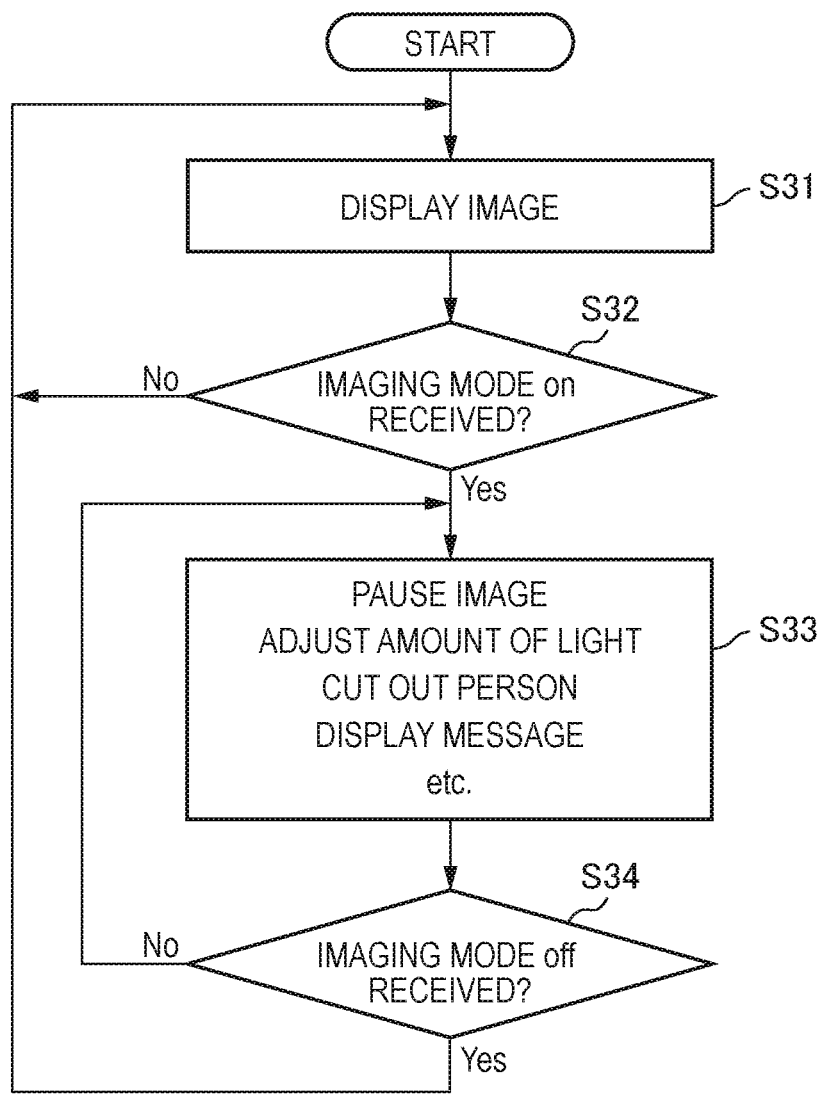
FIG. 16 is a flowchart illustrating exemplary operations of the display control apparatus related to an example of changing the display of at least one of the foreground or the background for imaging.

FIG. 16 is a flowchart illustrating exemplary operations of the display control apparatus 10 related to the example of changing the display of at least one of the foreground D1 or the background D1 for imaging. As illustrated in FIG. 16, the display control unit 113 causes an image to be displayed in the foreground D1 and also causes an image to be displayed in the background D2 (S31). The image displayed in the foreground D1 corresponds to an example of the foreground content described above, while the image displayed in the background D2 corresponds to an example of the background content described above.

Subsequently, in the case in which the imaging mode on is not received by the communication unit 130 ("No" in S32), the display control unit 113 proceeds to S31. On the other hand, in the case in which the imaging mode on is received by the communication unit 130 ("Yes" in S32), the display control unit 113 proceeds to S33.

Next, the display control unit 113 temporarily stops the image in the foreground D1 and the image in the background D2. Alternatively, the display control unit 113 adjusts the amount of light of the image in the foreground D1. Alternatively, the display control unit 113 cuts out a region corresponding to the person H0 from the image in the foreground D1. Alternatively, the display control unit 113 causes a message to be displayed in at least one of the foreground D1 or the background D2 (S33). The message corresponds to an example of the predetermined image described above.

Subsequently, in the case in which the imaging mode off is not received by the communication unit 130 ("No" in S34), the display control unit 113 proceeds to S33. On the other hand, in the case in which the imaging mode off is received by the communication unit 130 ("Yes" in S34), the display control unit 113 proceeds to S31.

The above describes an example of changing the display of each of the foreground D1 and the background D2 for imaging.

[1.4. Exemplary Hardware Configuration]

Figure 17:
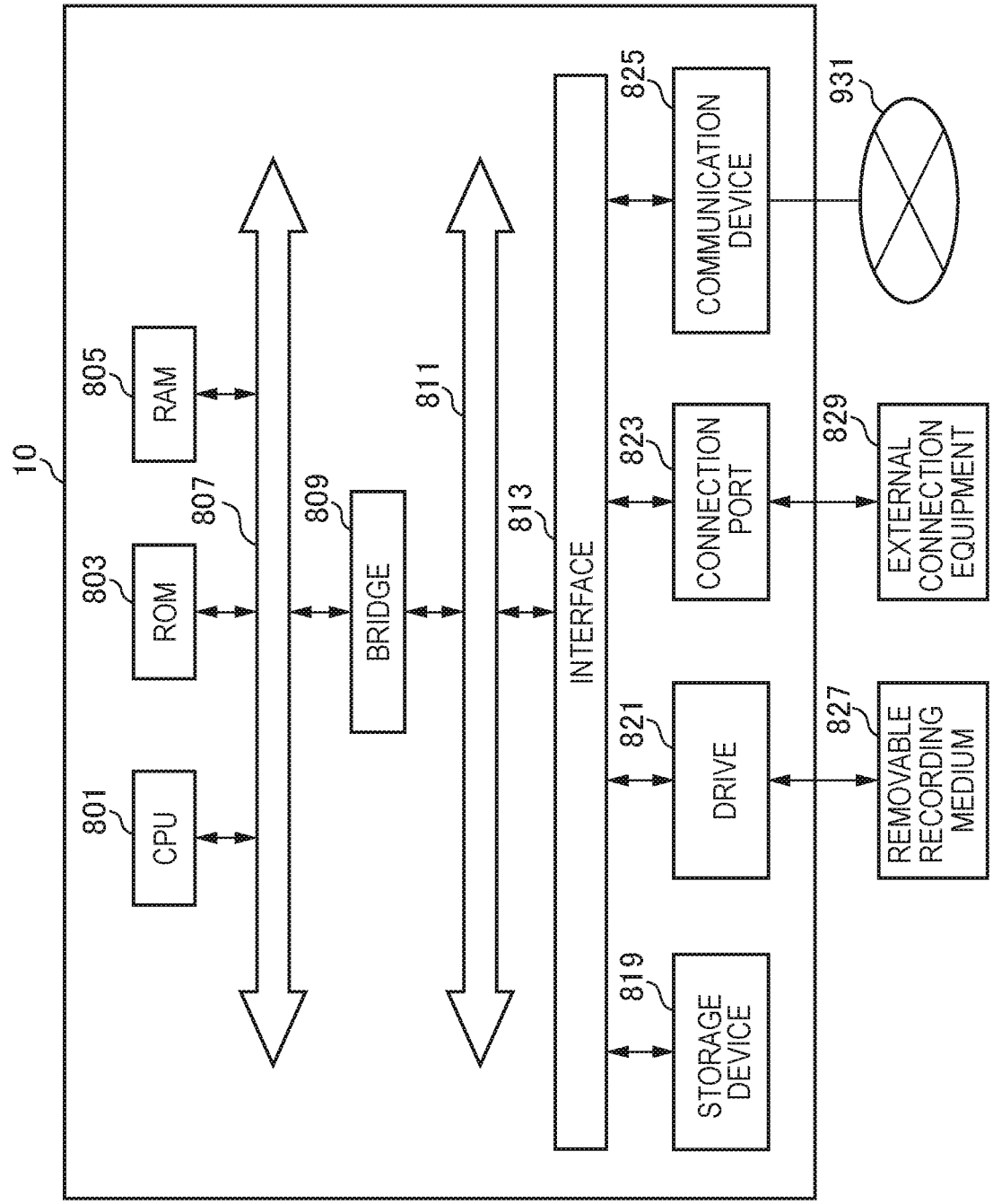
FIG. 17 is a block diagram illustrating an exemplary hardware configuration of the display control apparatus.

Next, with reference to FIG. 17, a hardware configuration of the display control apparatus 10 according to the embodiment of the present disclosure will be described. FIG. 17 is a block diagram illustrating the hardware configuration example of the display control apparatus 10 according to the embodiment of the present disclosure.

As illustrated in FIG. 17, the display control apparatus 10 includes a central processing unit (CPU) 801, read only memory (ROM) 803, and random access memory (RAM) 805. In addition, the display control apparatus 10 can include a host bus 807, a bridge 809, an external bus 811, an interface 813, a storage device 819, a drive 821, a connection port 823, and a communication device 825. The display control apparatus 10 can include processing circuitry such as a digital signal processor (DSP) or an application specific integrated circuit (ASIC), instead of or in addition to the CPU 801.

The CPU 801 functions as an arithmetic processing device and a control device, and controls the overall operation or a part of the operation of the display control apparatus 10 in accordance with various programs recorded in the ROM 803, the RAM 805, the storage device 819, or a removable recording medium 827. The ROM 803 stores programs, operation parameters, and the like used by the CPU 801. The RAM 805 temporarily stores programs used when the CPU 801 is executed, and parameters that change as appropriate when executing such programs. The CPU 801, the ROM 803, and the RAM 805 are connected with each other via the host bus 807 including an internal bus such as a CPU bus. In addition, the host bus 807 is connected to the external bus 811 such as peripheral component interconnect/interface (PCI) bus via the bridge 809.

The storage device 819 is a device for data storage configured as an example of the storage unit of the display control apparatus 10. The storage device 819 includes, in one example, a magnetic storage unit device such as hard disk drive (HDD), a semiconductor storage device, an optical storage device, or a magneto-optical storage device. The storage device 819 stores therein various data and programs executed by the CPU 801, and various data acquired from an outside.

The drive 821 is a reader/writer for the removable recording medium 827 such as a magnetic disk, an optical disc, a magneto-optical disk, and a semiconductor memory, and built in or externally attached to the display control apparatus 10. The drive 821 reads out information recorded on the mounted removable recording medium 827, and outputs the information to the RAM 805. In addition, the drive 821 writes the record into the mounted removable recording medium 827.

The connection port 823 is a port used to directly connect equipment to the display control apparatus 10. The connection port 823 may be a universal serial bus (USB) port, an IEEE1394 port, and a small computer system interface (SCSI) port, or the like. In addition, the connection port 823 may be an RS-232C port, an optical audio terminal, a high-definition multimedia interface (HDMI, registered trademark) port, and so on. The connection of the external connection equipment 829 to the connection port 823 makes it possible to exchange various kinds of data between the display control apparatus 10 and the external connection equipment 829.

The communication device 825 is a communication interface including, in one example, a communication device for connection to a network 931. The communication device 825 can be a communication card for use of, in one example, wired or wireless local area network (LAN), Bluetooth (registered trademark), or wireless USB (WUSB). The communication device 825 may also be, in one example, a router for optical communication, a router for asymmetric digital subscriber line (ADSL), or a modem for various types of communication. The communication device 825 transmits and receives a signal or the like to and from, in one example, the Internet or other communication devices using a predetermined protocol such as TCP/IP. In addition, the network 931 connected to the communication device 825 is a network established through wired or wireless connection. The network 931 is, in one example, the Internet, a home LAN, infrared communication, radio communication, satellite communication, or the like.

2. CONCLUSION

As described above, according to the embodiment of the present disclosure, there is provided the display control apparatus 10 provided with the display control unit 113 that controls the display of each of the foreground D1 and the background D2 according to whether or not a person exists in the inner region R0 of the space between the foreground D1 and the background D2. With this arrangement, in the case in which a person exists in the inner region R0, the display control unit 113 becomes able to present content such that the person is drawn to the content more strongly.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technique according to the present disclosure may achieve other effects that are clear to those skilled in the art from the description of this specification.

Additionally, the present technology may also be configured as below.

(1)

A display control apparatus including:

a display control unit that controls a display of each of a first display region and a second display region according to whether or not a person exists in an inner region of a space between the first display region and the second display region.

(2)
The display control apparatus according to (1), in which
the display control unit controls the display of each of the first display region and the second display region additionally according to whether or not a person exists in an outer region of the space between the first display region and the second display region.

(3)
The display control apparatus according to (1) or (2), in which
in a case in which a person exists in the inner region, the display control unit controls the display of each of the first display region and the second display region according to a direction of the person.

(4)
The display control apparatus according to (3), in which
in a case in which a person exists in the inner region, the display control unit controls the display of each of the first display region and the second display region according to which of the first display region and the second display region the person is facing.

(5)
The display control apparatus according to (1) or (2), in which
in a case in which a plurality of persons exist in the inner region, the display control unit controls the display of each of the first display region and the second display region on the basis of which of the first display region and the second display region more persons are facing.

(6)
The display control apparatus according to (1) or (2), in which
in a case in which a plurality of persons exist in the inner region, the display control unit decides a display region to be operated on the basis of which of the first display region and the second display region more persons are facing.

(7)
The display control apparatus according to (1) or (2), in which
in a case in which a person exists in the inner region, and content is displayed in the second display region, the display control unit performs control such that a screened region screened by the person existing in the inner region from among the content is displayed in the first display region.

(8)
The display control apparatus according to (1) or (2), in which
in a case in which a person exists in the inner region, the display control unit performs control such that predetermined content is displayed in a screened region screened by the person existing in the inner region from among the second display region.

(9)
The display control apparatus according to any one of (1) to (6), in which
the display control unit causes first content to be displayed in the first display region, and also causes second content to be displayed in the second display region.

(10)
The display control apparatus according to (9), in which
in a case in which a person exists in the inner region, the display control unit controls a parameter of each of the first content and the second content according to a position of the person existing in the inner region.

(11)
The display control apparatus according to (10), in which
the parameter includes at least one of an amount of shading or a brightness.

(12)
The display control apparatus according to any one of (9) to (11), in which
in a case in which a predetermined operation performed before imaging is detected, the display control unit stops a motion of each of the first content and the second content for a predetermined time.

(13)
The display control apparatus according to any one of (9) to (11), in which
in a case in which a predetermined operation performed before imaging is detected, the display control unit removes all or part of a region corresponding to an outline of a person existing in the inner region from the first content.

(14)
The display control apparatus according to any one of (9) to (11), in which
in a case in which a predetermined operation performed before imaging is detected, the display control unit lowers a brightness of the first content.

(15)
The display control apparatus according to any one of (9) to (11), in which
in a case in which a predetermined operation performed before imaging is detected, the display control unit performs control such that composite content in which the first content and the second content are composited is displayed in the second display region.

(16)
The display control apparatus according to any one of (9) to (11), in which
in a case in which a predetermined operation performed before imaging is detected, the display control unit performs control such that a predetermined image different from the first content and the second content is displayed in at least one of the first display region or the second display region.

(17)
The display control apparatus according to any one of (12) to (16), in which
the predetermined operation includes at least one of an operation of launching an application that executes imaging, an operation of pressing a shutter button for imaging, an operation of half-pressing the shutter button, or an explicit operation for indicating that imaging is about to be executed.

(18)
The display control apparatus according to any one of (1) to (17), in which
a transmissive screen exists in the first display region, and the second display region is visible through the first display region.

(19)
A display control method including:
controlling, by a processor, a display of each of a first display region and a second display region according to whether or not a person exists in an inner region of a space between the first display region and the second display region.

(20)
A program causing a computer to function as a display control apparatus including:
a display control unit that controls a display of each of a first display region and a second display region according to whether or not a person exists in an inner region of a space between the first display region and the second display region.

REFERENCE SIGNS LIST 1 display control system
10 display control apparatus
20 terminal
30 projector
40 sensor
110 control unit
111 data acquisition unit
112 determination unit
113 display control unit
120 storage unit
130 communication unit
A11 region corresponding to outline of person
C11, C12 inward content
C13 character string
C21 outward content
C22 operable content
D1 first display region (foreground)
D2 second display region (background)
G0 captured image
H0 to H3 person
J0 screened region
K0 duplicate region
M0 character string
R0 inner region
R1 outer region

The invention claimed is:

1. A display control apparatus, comprising:
a central processing unit (CPU) configured to:
  determine each of an existence of a first person in an inner region and an existence of a second person in an outer region, wherein
    the inner region corresponds to a space between a first display region and a second display region,
    the outer region corresponds to a space in front of the first display region, and
    the outer region is different from the inner region;
  control display of each of the first display region and the second display region based on the determination of each of the existence of the first person in the inner region and the existence of the second person in the outer region; and
  control, based on the existence of the first person in the inner region, display of specific content in a screened region of the second display region,
    wherein the screened region is screened by the first person that exists in the inner region.

2. The display control apparatus according to claim 1, wherein the CPU is further configured to:
  determine a face direction of the first person; and
  control the display of each of the first display region and the second display region based on the determination of the face direction of the first person and the existence of the first person in the inner region.

3. The display control apparatus according to claim 2, wherein the CPU is further configured to:
  determine, based on the existence of the first person in the inner region, the first person faces one of the first display region or the second display region; and
  control the display of each of the first display region and the second display region based on the determination the first person faces the one of the first display region or the second display region.

4. The display control apparatus according to claim 1, wherein
  in a case in which a plurality of persons exists in the inner region, the CPU is further configured to control the display of each of the first display region and the second display region based on which of the first display region and the second display region more persons are facing.

5. The display control apparatus according to claim 1, wherein
  in a case in which a plurality of persons exists in the inner region, the CPU is further configured to determine operation of one of the first display region or the second display region based on which of the first display region and the second display region more persons are facing.

6. The display control apparatus according to claim 1, wherein
  the CPU is further configured to control display of the screened region in the first display region, based on the existence of the first person in the inner region and display of first content in the second display region, and
  the screened region corresponds to a part of the first content.

7. The display control apparatus according to claim 1, wherein the CPU is further configured to:
  control display of first content in the first display region; and
  control display of second content in the second display region.

8. The display control apparatus according to claim 7, wherein the CPU is further configured to control a parameter of each of the first content and the second content based on a position of the first person in the inner region.

9. The display control apparatus according to claim 8, wherein the parameter includes at least one of an amount of shading or a brightness.

10. The display control apparatus according to claim 7, wherein the CPU is further configured to stop a motion of each of the first content and the second content for a specific time based on detection of a specific operation executed prior to an imaging operation.

11. The display control apparatus according to claim 10, wherein
  the specific operation includes at least one of a launch operation of an application that executes the imaging operation, a press operation of a shutter button for the imaging operation, a half-press operation of the shutter button, or an explicit operation for indication that the imaging operation is about to be executed.

12. The display control apparatus according to claim 7, wherein the CPU is further configured to remove at least a part of a region corresponding to an outline of the first person from the first content, based on detection of a specific operation executed prior to an imaging operation.

13. The display control apparatus according to claim 7, wherein the CPU is further configured to lower a brightness of the first content based on detection of a specific operation executed prior to an imaging operation.

14. The display control apparatus according to claim 7, wherein
  the CPU is further configured to control display of composite content in the second display region based on detection of a specific operation executed prior to an imaging operation, and the composite content includes the first content and the second content.

15. The display control apparatus according to claim 7, wherein
the CPU is further configured to control, based on detection of a specific operation executed prior to an imaging operation, display of a specific image in at least one of the first display region or the second display region, and
the specific image is different from the first content and the second content.

16. The display control apparatus according to claim 1, wherein
a transmissive screen exists in the first display region, and
the second display region is visible through the first display region.

17. A display control method, comprising:
determining, by a processor, each of an existence of a first person in an inner region and an existence of a second person in an outer region, wherein
the inner region corresponds to a space between a first display region and a second display region,
the outer region corresponds to a space in front of the first display region, and
the outer region is different from the inner region;
controlling, by the processor, display of each of the first display region and the second display region based on the determination of each of the existence of the first person in the inner region and the existence of the second person in the outer region; and
controlling, by the processor based on the existence of the first person in the inner region, display of specific content in a screened region of the second display region,
wherein the screened region is screened by the first person that exists in the inner region.

18. A non-transitory computer-readable medium having stored thereon computer-executable instructions that, when executed by a processor, cause the processor to execute operations, the operations comprising:
determining each of an existence of a first person in an inner region and an existence of a second person in an outer region, wherein
the inner region corresponds to a space between a first display region and a second display region,
the outer region corresponds to a space in front of the first display region, and
the outer region is different from the inner region;
controlling display of each of the first display region and the second display region based on the determination of each of the existence of the first person in the inner region and the existence of the second person in the outer region; and
controlling, based on the existence of the first person in the inner region, display of specific content in a screened region of the second display region,
wherein the screened region is screened by the first person that exists in the inner region.

19. A display control apparatus, comprising:
a central processing unit (CPU) configured to:
control display of each of a first display region and a second display region based on an existence of a person in an inner region of a space between the first display region and the second display region; and
control display of a screened region in the first display region, based on the existence of the person in the inner region and display of content in the second display region, wherein
the screened region is screened by the person that exists in the inner region, and
the screened region corresponds to a part of the content.

* * * * *